United States Patent
Kim et al.

(10) Patent No.: US 9,055,280 B2
(45) Date of Patent: Jun. 9, 2015

(54) METHOD AND APPARATUS FOR TRANSMITTING DIGITAL BROADCASTING STREAM USING LINKING INFORMATION ABOUT MULTI-VIEW VIDEO STREAM, AND METHOD AND APPARATUS FOR RECEIVING THE SAME

(75) Inventors: Yong-tae Kim, Seoul (KR); Jae-jun Lee, Suwon-si (KR); Yong-seok Jang, Hwaseong-si (KR); Kil-soo Jung, Osan-si (KR); Hong-seok Park, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 643 days.

(21) Appl. No.: 13/016,339

(22) Filed: Jan. 28, 2011

(65) Prior Publication Data
US 2011/0181694 A1    Jul. 28, 2011

Related U.S. Application Data

(60) Provisional application No. 61/299,121, filed on Jan. 28, 2010.

(30) Foreign Application Priority Data

May 11, 2010 (KR) .......................... 10-2010-0044056

(51) Int. Cl.
*H04N 13/00* (2006.01)
*H04N 13/04* (2006.01)

(52) U.S. Cl.
CPC ....... *H04N 13/0048* (2013.01); *H04N 13/0059* (2013.01); *H04N 13/0029* (2013.01); *H04N 13/0452* (2013.01); *H04N 2213/003* (2013.01)

(58) Field of Classification Search
CPC ...................... H04N 13/0048; H04N 13/0051

USPC ....................................... 348/42–60; 386/248
See application file for complete search history.

(56) References Cited

U.S. PATENT DOCUMENTS

| | | | |
|---|---|---|---|
| 6,014,368 | A | 1/2000 | Sanami |
| 6,901,078 | B2 | 5/2005 | Morris |

(Continued)

FOREIGN PATENT DOCUMENTS

| | | |
|---|---|---|
| CN | 1893653 A | 1/2007 |
| JP | 2005-006114 A | 1/2005 |

(Continued)

OTHER PUBLICATIONS

Communication dated Oct. 27, 2011 issued by the International Searching Authority in counterpart International Patent Application No. PCT/KR2011/000631.

(Continued)

*Primary Examiner* — William C Vaughn, Jr.
*Assistant Examiner* — Naod Belai
(74) *Attorney, Agent, or Firm* — Sughrue Mion, PLLC

(57) ABSTRACT

A digital broadcasting stream transmitting method and a digital broadcasting stream receiving method and apparatus for providing three-dimensional (3D) video services are provided. The transmitting method including: generating a plurality of elementary streams (ESs) for a plurality of pieces of video information including at least one of information about a base-view video of a 3D video, information about an additional-view video corresponding to the base-view video, and a two-dimensional (2D) video having a different view from views of the 3D video; multiplexing the plurality of ESs with link information for identifying at least one piece of video information linked with the plurality of pieces of video information, to generate at least one transport stream (TS); and transmitting the generated at least one TS via at least one channel.

43 Claims, 17 Drawing Sheets

(56) References Cited

U.S. PATENT DOCUMENTS

| | | | |
|---|---|---|---|
| 7,137,490 | B2 | 11/2006 | Fabricius et al. |
| 7,873,072 | B2 | 1/2011 | Kim et al. |
| 8,111,283 | B2* | 2/2012 | Kim et al. .................. 348/43 |
| 8,164,619 | B2* | 4/2012 | Sasaki et al. ............... 348/42 |
| 2006/0159442 | A1 | 7/2006 | Kim et al. |
| 2008/0310499 | A1* | 12/2008 | Kim et al. ............ 375/240.01 |
| 2010/0134592 | A1 | 6/2010 | Kim et al. |
| 2010/0277568 | A1* | 11/2010 | Yun et al. .................. 348/43 |
| 2010/0303444 | A1* | 12/2010 | Sasaki et al. .............. 386/248 |
| 2011/0149026 | A1* | 6/2011 | Luthra ...................... 348/43 |

FOREIGN PATENT DOCUMENTS

| | | | |
|---|---|---|---|
| JP | 2008-500790 | A | 1/2008 |
| JP | 2002-218502 | A | 8/2008 |
| JP | 2010-130690 | A | 6/2010 |
| KR | 10-2004-0036566 | A | 4/2004 |
| KR | 1020050111379 | A | 11/2005 |
| KR | 10-2006-0069959 | A | 6/2006 |
| KR | 10-2006-0083138 | A | 7/2006 |
| KR | 1020070058302 | A | 6/2007 |
| KR | 1020070061227 | A | 6/2007 |
| KR | 1020070080730 | A | 8/2007 |
| WO | 2005-114998 | A1 | 12/2005 |
| WO | 2009040701 | A2 | 4/2009 |
| WO | WO 2009119955 | A1 | 10/2009 |
| WO | 2011-136239 | A1 | 3/2011 |

OTHER PUBLICATIONS

J. Kim et al., "Real Time Synchronous MultiView Video Transport System over IP Networks," IEEE Trans. on Cosumer Electronics, vol. 34, No. 2, pp. 460-467, May 2008.

Y. Lee et al., "Design and Development of T-DMB Multichannel Audio Service System based on Spatial Audio Coding," ETRI Journal, vol. 31, No. 4, pp. 365-375, Aug. 2009.

Communication dated Sep. 2, 2014, issued by the Japanese Intellectual Property Office in counterpart Japanese Application No. 2012-551095.

Communication dated Mar. 9, 2015, issued by the State Intellectual Property Office of P.R. China in counterpart Chinese Application No. 201180016428.X.

* cited by examiner

METHOD AND APPARATUS FOR TRANSMITTING DIGITAL BROADCASTING STREAM USING LINKING INFORMATION ABOUT MULTI-VIEW VIDEO STREAM, AND METHOD AND APPARATUS FOR RECEIVING THE SAME

CROSS-REFERENCE TO RELATED PATENT APPLICATIONS

This application claims the benefit of U.S. Provisional Patent Application No. 61/299,121, filed on Jan. 28, 2010 in the U.S. Patent and Trademark Office, and priority from Korean Patent Application No. 10-2010-0044056, filed on May 11, 2010 in the Korean Intellectual Property Office, the disclosures of which are incorporated herein in their entireties by reference.

BACKGROUND

1. Field

Apparatuses and methods consistent with exemplary embodiments relate to digital data transmitting and receiving for providing two-dimensional (2D) contents or three-dimensional (3D) contents.

2. Description of the Related Art

In a Moving Picture Experts Group (MPEG) Transport (TS) based digital broadcasting method, a transmission terminal inserts uncompressed video data and an uncompressed audio stream into respective elementary streams (ESs), multiplexes each of the ESs to generate a TS, and transmits the TS via a channel.

The TS includes program specification information (PSI) together with the ESs. The PSI representatively includes a program association table (hereinafter, referred to as PAT information) and a program map table (hereinafter, referred to as PMT information). PMT information providing single-program information describes a Packet Identifier (PID) for each ES, and PAT information describes a PID for each PMT information.

A reception terminal receives a TS via a channel and extracts an ES from the TS through a process reverse to the process performed in a transmission terminal. Digital contents contained in the ES is restored and reproduced by a display device.

SUMMARY

According to an aspect of an exemplary embodiment, there is provided a digital broadcasting stream transmitting method for providing 3D video services, the method including: generating a plurality of ESs for a plurality of pieces of video information including at least one of information about a base-view video of a 3D video, information about an additional-view video corresponding to the base-view video, and a 2D video having a different view from views of the 3D video; generating at least one TS by multiplexing the plurality of ESs with link information for identifying at least one piece of video information linked with each of the plurality of pieces of video information; and transmitting the generated at least one TS via at least one channel.

The generating the at least one TS may include multiplexing each of the ESs to generate at least one TS, and the transmitting the at least one TS may include transmitting the at least one multi-program transport stream via different channels.

The generating the at least one TS may include multiplexing each of the ESs to generate at least one TS, and the transmitting the least one TS may include transmitting the at least one TS via a single channel.

The generating the at least one TS may include multiplexing the ESs to generate a single TS, and the transmitting the least one TS may include transmitting the single TS via a single channel.

According to an aspect of another exemplary embodiment, there is provided a digital broadcasting stream receiving method for providing 3D video services, the method including: receiving at least one TS for a plurality of pieces of video information including at least one of information about a base-view video of a 3D video, information about an additional-view video of the 3D video, and a 2D video having a different view from views of the 3D video, via at least one channel; demultiplexing the received at least one TS to extract, from the at least one TS, linking information for identifying at least one piece of video information linked with the plurality of pieces of video information and at least one ES for the plurality of pieces of video information; and decoding the extracted at least one ES to reproduce at least one of the 3D video and the 2D video restored by the decoding based on the linking information.

The receiving may include receiving a plurality of TS by decoding each of the at least one channel and receiving a single TS from each of the at least one channel, and the extracting may include extracting at least one ES by demultiplexing each of the at least one multi-program TS.

The receiving may include receiving a plurality of TSs via a channel from among the at least one channel by decoding the channel, and the extracting may include extracting the at least one ES by demultiplexing each of the at least one TS.

The receiving may include receiving a TS of a channel from among the at least one channel by decoding the channel, and the extracting may include extracting the at least one ES by demultiplexing the transport stream.

The linking information may include a link identifier that represents whether mutually linked pieces of video information exist in the plurality of pieces of video information included in the at least one TS, and a link descriptor that includes information about a link between mutually linked pieces of video information from among the plurality of pieces of video information included in the at least one TS.

The link identifier may be included in a program association table for the at least one TS.

The link descriptor may be included in a program map table for the ESs for the mutually linked pieces of video information.

A 3D video stream descriptor including additional information used to reproduce current video information of a current TS may be included in a program map table for the current video information.

According to an aspect of another exemplary embodiment, there is provided a digital broadcasting stream transmitting apparatus for providing 3D video services, the apparatus including: an ES generation unit which generates a plurality of ESs for a plurality of pieces of video information including at least one of information about a base-view video of a 3D video, information about an additional-view video corresponding to the base-view video, and a 2D video having a different view from views of the 3D video; a TS generation unit which generates at least one TS by multiplexing the generated plurality of ESs with link information for identifying at least one piece of video information linked with the plurality of pieces of video information; and a transmission unit which transmits the at least one TS via at least one channel.

According to an aspect of another exemplary embodiment, there is provided a digital broadcasting stream receiving apparatus for providing 3D video services, the apparatus including: a TS receiving unit which receives at least one TS for a plurality of pieces of video information including at least one of information about a base-view video of a 3D video, information about an additional-view video of the 3D video, and a 2D video having a different view from views of the 3D video, via at least one channel; an ES extraction unit which demultiplexes the received at least one TS to extract, from the at least one TS, linking information for identifying at least one piece of video information linked with the plurality of pieces of video information and at least one ES for the plurality of pieces of video information; and a reproduction unit which reproduces at least one of the 3D video data and 2D video data restored by decoding the extracted at least one ES based on a link represented by the linking information.

According to an aspect of another exemplary embodiment, there is provided a computer-readable recording medium having recorded thereon a program for the above-described digital broadcasting stream transmitting method for providing 3D video services.

According to an aspect of another exemplary embodiment, there is provided a computer-readable recording medium having recorded thereon a program for the above-described digital broadcasting stream receiving method for providing 3D video services.

BRIEF DESCRIPTION OF THE DRAWINGS

The above and/or other aspects will become more apparent by describing in detail exemplary embodiments with reference to the attached drawings in which.

DETAILED DESCRIPTION OF EXEMPLARY EMBODIMENTS

Hereinafter, exemplary embodiments will be described more fully with reference to the accompanying drawings. It is understood that expressions such as "at least one of," when preceding a list of elements, modify the entire list of elements and do not modify the individual elements of the list. Further, a "unit" as used herein may be embodied as a hardware component and/or a software component that is executed by a computer or a hardware processor.

A digital broadcasting stream transmitting apparatus and method capable of providing 3D video services and a digital broadcasting stream receiving apparatus and method capable of providing 3D video services according to exemplary embodiments will now be described in detail with reference to FIGS. 1 through 20.

Figure 1:
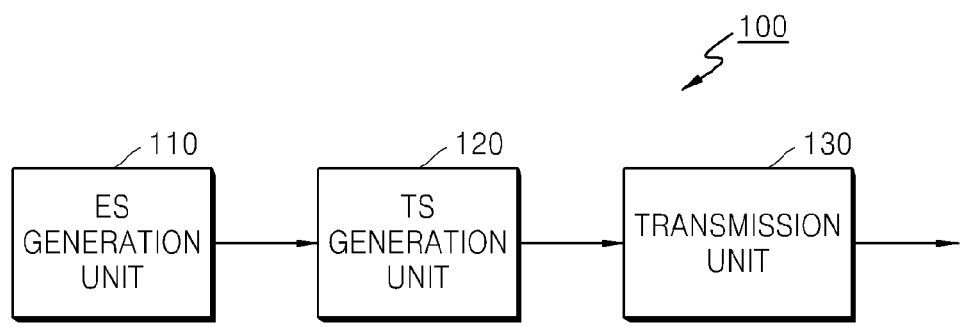
FIG. 1 is a block diagram of a digital broadcasting stream transmitting apparatus according to an exemplary embodiment.

FIG. 1 is a block diagram of a digital broadcasting stream transmitting apparatus 100 according to an exemplary embodiment.

Referring to FIG. 1, the digital broadcasting stream transmitting apparatus 100 includes an elementary stream (ES) generation unit 110, a transport stream (TS) generation unit 120, and a transmission unit 130.

The ES generation unit 110 generates a plurality of ESs for a plurality of pieces of video information including at least one of information about a base-view video of a 3D video, information about an additional-view video of the 3D video, and a two-dimensional (2D) video.

A single ES may be generated for a single piece of video information. The 3D video may be a combination of a single base-view video and a single additional-view video corresponding to the single base-view video, such as a stereo video, or a combination of a single base-view video and a plurality of additional-view videos corresponding to the single base-view video.

The information about the additional-view video represents an additional-view video corresponding to a base-view video, and thus may be additional-view video data itself or at least one of depth information, disparity information, and the like relative to the base-view video data.

The 2D video may not be a one-view video of the 3D video but a 2D video having a view separate from the views of the 3D video.

The TS generation unit 120 receives the plurality of ESs generated by the ES generation unit 110. The TS generation unit 120 multiplexes linking information between the plurality of pieces of video information with the plurality of ESs to generate at least one TS for the plurality of ESs. The transmission unit 130 transmits the at least one TS via at least one channel.

The linking information includes identifiers for indicating at least one video information piece associated with each of the plurality of video information pieces.

The TS generation unit 120 may generate at least one TS by multiplexing each of the plurality of ESs, and the transmission unit 130 may transmit the at least one TS via different channels.

The TS generation unit 120 may generate at least one TS by individually multiplexing the plurality of ESs, and the transmission unit 130 may transmit the at least one TS via a single channel.

The TS generation unit 120 may generate a single TS by multiplexing the plurality of ESs, and the transmission unit 130 may transmit the single TS via a single channel.

An operation of the TS generation unit 120 will now be described in detail.

The TS generation unit 120 may packetize the ESs individually to generate packetized elementary stream (PES) packets, and multiplex a program map table (hereinafter, referred to as PMT information) including the PES packets and linking information so as to generate a single-program transport stream (SP TS). The TS generation unit 120 may generate an SP TS by multiplexing a video ES, an audio ES, additional data, and the like. The PMT information may be generated for each SP.

The TS generation unit 120 may generate a multi-program transport stream (MP TS) by multiplexing at least one SP TS with a program association table (hereinafter, referred to as PAT information).

In this case, a plurality of MP TSs not greater than the total number of SP TSs may be generated by multiplexing the SP TSs into several groups.

First through fifth exemplary embodiments in which the TS generation unit 120 and the transmission unit 130 transmit a plurality of pieces of video information via different ESs, different TSs, or different channels will now be described.

According to the first exemplary embodiment, the TS generation unit 120 may generate at least one SP TS by multiplexing at least one ES individually, and generate at least one MP TS by multiplexing the at least one SP TS individually. According to the first exemplary embodiment, the transmission unit 130 may transmit the at least one MP TS generated by the TS generation unit 120 according to the first exemplary embodiment via channels based on the same transmission network system, respectively.

According to the second exemplary embodiment, the TS generation unit 120 may generate at least one SP TS by multiplexing at least one ES individually, and generate a single MP TS by multiplexing the at least one SP TS together. According to the second exemplary embodiment, the transmission unit 130 may transmit the single MP TS generated by the TS generation unit 120 according to the second exemplary embodiment via a single channel.

According to the third exemplary embodiment, the TS generation unit 120 may generate a single SP TS by multiplexing at least one ES together, and generate a single MP TS by multiplexing the single SP TS. According to the third embodiment, the transmission unit 130 may transmit the single MP TS generated by the TS generation unit 120 according to the third exemplary embodiment via a single channel.

According to the fourth exemplary embodiment, the TS generation unit 120 may generate at least one SP TS and at least one MP TS from at least one ES as in the first exemplary embodiment. However, in contrast with the first exemplary embodiment, the transmission unit 130 according to the fourth exemplary embodiment may transmit the at least one MP TS via channels based on individual kinds of transmission network systems, respectively.

According to the fifth exemplary embodiment, the TS generation unit 120 may individually multiplex an ES for at least one base-view video from among at least one ES to generate at least one SP TS for the at least one base-view video. According to the fifth exemplary embodiment, the TS generation unit 120 may individually multiplex the at least one SP TS for the at least one base-view video to generate at least one base-view MP TS.

In addition, according to the fifth exemplary embodiment, the TS generation unit 120 may individually multiplex an ES for at least one additional-view video corresponding to the at least one base-view video to generate at least one SP TS for the at least one additional-view video. According to the fifth exemplary embodiment, the TS generation unit 120 may multiplex the at least one SP TS for the at least one additional-view video together to generate a single additional-view MP TS.

According to the fifth exemplary embodiment, the transmission unit 130 may transmit the at least one base-view MP TS and the single additional-view MP TS generated by the TS generation unit 120 according to the fifth exemplary embodiment via different channels, respectively.

Referring back to FIG. 1, the TS generation unit 120 may include linking information between a plurality of pieces of video information in the at least one TS by inserting the linking information into program specification information (PSI).

The linking information may be classified into a link identifier and a link descriptor.

The link identifier indicates whether associated pieces of video information exist in the plurality of pieces of video information included in the at least one TS. The TS generation unit 120 may include the link identifier in the PAT information about the at least one TS. In this case, the link identifier may indicate whether pieces of PMT information identified by the PAT information are linked to each other.

The link descriptor may include information about a link between the associated pieces of video information existing in the plurality of pieces of video information included in the at least one TS. The TS generation unit 120 may insert the link descriptor into a descriptor region of the PMT information.

The TS generation unit 120 may insert not only the linking information but also a 3D video authentication descriptor for representing whether a current ES is for a 3D video, into the PMT information. For example, at least one of a 3D video start descriptor including 3D video information start information representing a location where additional information about the 3D video starts to be inserted, and a 3D video registration descriptor including format identifier information of the 3D video may be inserted into PMT information about the current ES.

The link identifier will be described in greater detail below with reference to Table 1, the link descriptor will be described in greater detail below with reference to Tables 4, 5, and 6, and the 3D video authentication descriptor will be described in greater detail below with reference to Tables 2 and 3.

The TS generation unit 120 may insert not only the linking information but also a 3D video stream descriptor including additional information used for reproducing current video information of a current TS, into PMT information for the current video information.

The 3D video stream descriptor may include information about conversion of a 2D/3D reproduction mode that occurs on a current video stream.

The 3D video stream descriptor may include information about the views of a 3D video used to set view information individually, for example, for children and adults.

The 3D video stream descriptor will be described in greater detail below with reference to Tables 7 through 16.

Accordingly, the digital broadcasting stream transmitting apparatus 100 of FIG. 1 may insert 3D video information into different channels, different TSs, or different ESs to transmit the 3D video information. As for associated pieces of video information, linking information for identifying locations into which their opponent pieces of video information have been inserted may be set. The linking information may be inserted into PMT information of TSs for the associated video information pieces and transmitted.

Figure 2:
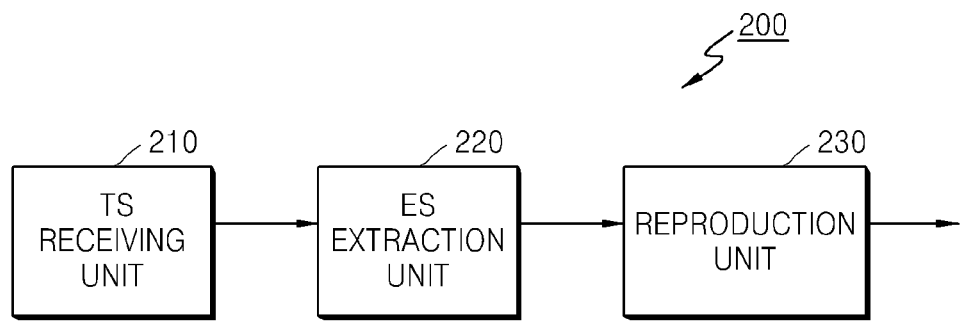
FIG. 2 is a block diagram of a digital broadcasting stream receiving apparatus according to an exemplary embodiment.

FIG. 2 is a block diagram of a digital broadcasting stream receiving apparatus 200 according to an exemplary embodiment.

Referring to FIG. 2, the digital broadcasting stream receiving apparatus 200 includes a TS receiving unit 210, an ES extraction unit 220, and a reproduction unit 230.

The TS receiving unit 210 receives at least one TS including a plurality of pieces of video information via at least one channel. The received at least one TS may include at least one of information about a base-view video of a 3D video, information about an additional-view video corresponding to the base-view video, and a 2D video. The 2D video may be video information of a view different from the views of the 3D video. The information about the additional-view video corresponding to the base-view video may be additional-view video data itself or may be at least one of disparity information and depth information that allows the additional-view video data to be restored based on the base-view video data.

The ES extraction unit 220 receives the at least one TS from the TS receiving unit 210 and demultiplexes the TS to extract at least one ES for the plurality of video information pieces from the TS. The ES extraction unit 220 also extracts linking information between video information pieces from the demultiplexed TS.

The TS receiving unit 210 may receive an MP TS via at least one channel. A single MP TS may be received via each channel.

The TS receiving unit 210 may receive a plurality of TSs by individually decoding a plurality of channels and receiving a single TS from each of the channels. The ES extraction unit 220 may extract a plurality of ESs by demultiplexing a plurality of MP TSs individually.

The TS receiving unit 210 may receive a plurality of TSs by decoding a single channel, and the ES extraction unit 220 may extract a plurality of ESs by demultiplexing the plurality of TSs.

The TS receiving unit 210 may receive a single TS by decoding a single channel, and the ES extraction unit 220 may extract a plurality of ESs by demultiplexing the single TS.

An operation of the ES extraction unit 220 will now be described in greater detail.

The ES extraction unit 220 may demultiplex an MP TS to extract at least one SP TS together with PAT information from the demultiplexed MP TS. The ES extraction unit 220 may demultiplex each SP TS to extract PES packets and PMT information.

The PMT information may include linking information about a link between a plurality of ESs included in the at least one SP TS. The PES packets may be depacketized into the ESs.

Each ES may include base-view video information for a 3D video, additional-view video information for the 3D video, a 3D composite format of the base-view video information and the additional-view video information, or 2D video information. The ES extraction unit 220 may also extract an audio ES from the demultiplexed SP TS.

Since a single MP TS may be demultiplexed into at least one SP TS, no fewer SP TSs than a plurality of MP TSs may be extracted.

The TS receiving unit 210 and the ES extraction unit 220 respectively receive and demultiplex a TS generated and transmitted respectively by the TS generation unit 120 and the transmission unit 130. Accordingly, operations of the TS receiving unit 210 and the ES extraction unit 220 to receive the at least one TS and extract an ES from the TS according to the aforementioned first through fifth exemplary embodiments are as follows.

According to the first exemplary embodiment, the TS receiving unit 210 may receive at least one MP TS by decoding at least one channel individually and receiving a single MP TS from each of the channels. According to the first exemplary embodiment, the ES extraction unit 220 may demultiplex the at least one MP TS individually to extract a single SP TS from each of the MP TSs, and demultiplex each of the SP TSs to extract a single ES from each of the SP TSs. Thus, the TS receiving unit 210 and the ES extraction unit 220 according to the first exemplary embodiment may finally extract ESs for 3D video information or 2D video information from at least one TS received for at least one channel.

According to the second exemplary embodiment, the TS receiving unit 210 may decode a single channel to extract a single MP TS. According to the second exemplary embodiment, the ES extraction unit 220 may demultiplex the single MP TS to extract at least one SP TS, and demultiplex the at least one SP TS individually to extract at least one ES. Thus, the TS receiving unit 210 and the ES extraction unit 220 according to the second exemplary embodiment may extract at least one SP TS via a single channel and thus extract ESs for 3D video information or 2D video information.

According to the third exemplary embodiment, the TS receiving unit 210 may decode a single channel to extract a single MP TS. According to the third exemplary embodiment, the ES extraction unit 220 may demultiplex the single MP TS to extract a single SP TS, and demultiplex the single SP TS to extract at least one ES. Accordingly, the TS receiving unit 210 and the ES extraction unit 220 according to the third exemplary embodiment may finally extract at least one ES including 3D video information or 2D video information via a single channel.

According to the fourth exemplary embodiment, in contrast with the first exemplary embodiment, the TS receiving unit 210 may individually decode channels based on individual kinds of transmission network systems and receive a single MP TS for each channel to thereby receive at least one MP TS. According to the fourth exemplary embodiment, the ES extraction unit 220 may demultiplex the at least one MP TS individually to extract a single SP TS from each of the at least one MP TS, and demultiplex each SP TS to extract a single ES from each of the SP TSs. Thus, the TS receiving unit 210 and the ES extraction unit 220 according to the fourth exemplary embodiment may finally extract ESs for 3D video information or 2D video information from TSs respectively received via a plurality of channels based on individual kinds of transmission network systems.

According to the fifth exemplary embodiment, the TS receiving unit 210 may decode a plurality of channels to receive at least one base-view MP TS for a 3D video from at least one of the plurality of channels and receive a single additional-view MP TS for the 3D video from one of the plurality of channels.

According to the fifth exemplary embodiment, the ES extraction unit 220 may demultiplex the at least one base-view MP TS individually to extract at least one base-view SP TS, and demultiplex the at least one base-view SP TS individually to extract at least one base-view ES. According to the fifth exemplary embodiment, the ES extraction unit 220 may also demultiplex the single additional-view MP TS to extract at least one additional-view SP TS, and demultiplex the at least one additional-view SP TS individually to extract at least one additional-view ES.

Accordingly, the TS receiving unit 210 and the ES extraction unit 220 according to the fifth exemplary embodiment may finally extract a plurality of ESs for 3D video information or 2D video information via a plurality of channels.

Referring back to FIG. 2, the linking information extracted from the ES extraction unit 220 includes an identifier for indicating at least one piece of video information associated with each of a plurality of pieces of video information. The linking information may be used by the reproduction unit 230 to search for other video data corresponding to predetermined video data and reproduce the video data while maintaining a link therebetween.

The ES extraction unit 220 may extract linking information between a plurality of pieces of video information from PSI of a TS. The linking information may include a link identifier and a link descriptor. The ES extraction unit 220 may extract the link identifier of the linking information from PAT information of the TS. In this case, the link identifier may represent whether pieces of PMT information identified by the PAT information are linked to each other. The ES extraction unit 220 may extract the link descriptor of the linking information from a descriptor region of the PMT information.

The ES extraction unit 220 may extract not only the linking information but also a 3D video authentication descriptor from the PMT information. Whether 3D video information is included in a current ES may be checked from at least one of a 3D video start descriptor and a 3D video registration descriptor extracted as the 3D authentication descriptor.

The link identifier will be described in greater detail below with reference to Table 1, the link descriptor will be described in greater detail below with reference to Tables 4, 5, and 6, and the 3D video authentication descriptor will be described in greater detail below with reference to Tables 2 and 3.

The ES extraction unit 220 may extract not only the linking information but also a 3D video stream descriptor from PMT information for current video information. The ES extraction unit 220 may extract information related to conversion of a 2D/3D reproduction mode that occurs on a current video stream, information related with the views of a 3D video used to set view information individually, for example, for children and adults, and other information from the 3D video stream descriptor. The 3D video stream descriptor will be described in greater detail below with reference to Tables 7 through 16.

The reproduction unit 230 decodes the at least one ES extracted by the ES extraction unit 220 to restore 3D video data or 2D video data. The reproduction unit 230 may reproduce at least one of the restored 3D video data and the restored 2D video data in consideration of a link represented by the linking information.

For example, if the reproduction unit 230 receives an ES for base-view video information of a 3D video and an ES for additional-view video information of the 3D video from the ES extraction unit 220, the reproduction unit 230 may restore base-view video data and additional-view video data of the 3D video from the ESs. In particular, the reproduction unit 230 may search for and restore the base-view video data and the additional-view video data based on the linking information, and may convert and reproduce the base-view video data and the additional-view video data in a 3D reproduction format that can be reproduced by a 3D display device.

If the reproduction unit 230 receives an ES for 2D video information and an ES for disparity information or depth information for additional-view video from the ES extraction unit 220, the reproduction unit 230 may restore the base-view video data and additional-view video data of the 3D video from the ESs. In particular, the reproduction unit 230 may search for disparity information or depth information corresponding to 2D video data based on the linking information to restore the additional-view video data, and may convert and reproduce the additional-view video data into a 3D reproduction format that can be reproduced by a 3D display device.

In addition, an ES for a 3D video of a 3D composite format and an ES for a 2D video may be input to the reproduction unit 230. The reproduction unit 230 may restore video information of a 3D composite format into 3D video data based on the linking information and may convert the 3D video data into base-view video data and additional-view video data that may both be reproduced by a 3D display device. Since the reproduction unit 230 may also restore 3D video data, the reproduction unit 230 may selectively reproduce the base-view video data, the additional-view video data, and the 2D video data.

If associated ESs for a 2D video are input to the reproduction unit 230, the reproduction unit 230 may restore corresponding items of 2D video data based on the linking information and selectively and independently reproduce the 2D video data items. The reproduction unit 230 may selectively reproduce the corresponding 2D video data items according to the linking information in a Picture-in-Picture (PIP) mode.

The ES extraction unit 220 of the digital broadcasting stream receiving apparatus 200 may detect associated pieces of video information transmitted via different channels, different SP TSs, or different ESs by using the linking information to extract only associated ESs. The reproduction unit 230 of the digital broadcasting stream receiving apparatus 200 may recognize the existence of different video streams associated with an SP video stream selected by a user according to the linking information and may reproduce the associated video streams.

The digital broadcasting stream transmitting apparatus 100 and the digital broadcasting stream receiving apparatus 200 may provide digital contents services of a 3D video and digital contents services of a 2D video while maintaining compatibility with digital broadcasting systems that use Moving Picture Experts Group (MPEG) based TSs.

Since PMT information includes information about a single video ES, a transmission terminal inserts, into each PMT information, association information for identifying an ES, a TS, or a channel in which opponent video information is located, and thus a reception terminal may reproduce associated items video data according to the association information between ESs, TSs, or channels in a 3D reproduction mode or a 2D reproduction mode.

In addition, since not only linking information but also information about a conversion between a 2D video reproduction method and a 3D video reproduction method and additional information about 3D video characteristics are transmitted and received via PMT information, the digital broadcasting stream transmitting apparatus 100 and the digital broadcasting stream receiving apparatus 200 may smoothly provide digital contents services of 3D video while maintaining compatibility with digital broadcasting systems for 2D contents services.

Without needing to newly generate PSI or a TS for the PSI, linking information between a plurality of pieces of video information and additional information such as a 3D video stream descriptor may be included in PMT information or PAT information. In addition, additional information may be included in a reserved field without needing to add a packet identifier (PID) to the PMT information.

Figure 3:
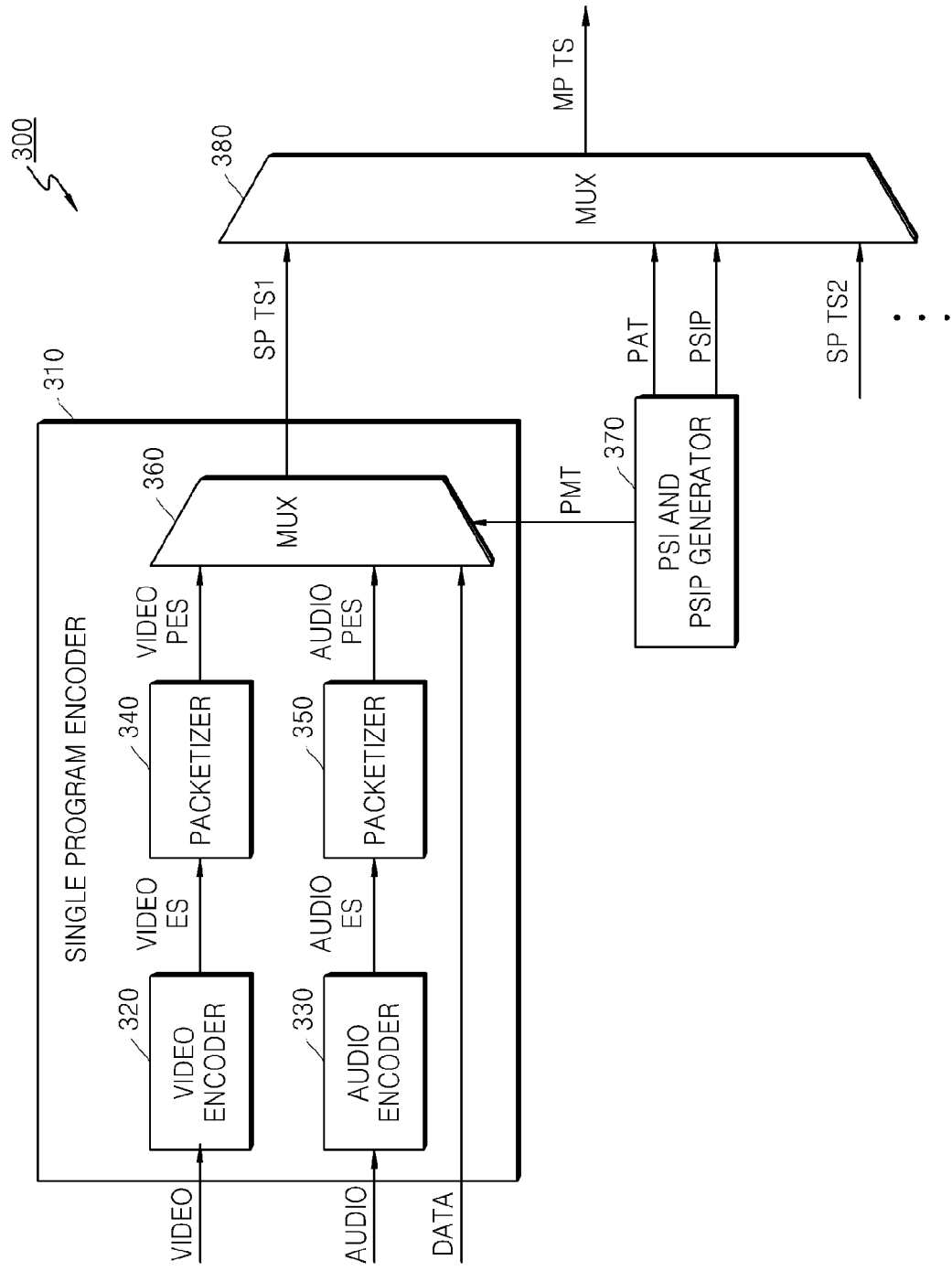
FIG. 3 is a block diagram of a digital TV transmitting system for 2D contents services according to an exemplary embodiment.

FIG. 3 is a block diagram of a digital TV transmitting system 300 for 2D contents services according to an exemplary embodiment.

Referring to FIG. 3, the digital TV transmitting system 300 generates an SP TS including a single video ES and a single audio ES by using a single-program encoder 310 and multiplexes at least one SP TS generated by a plurality of single-program encoders by using a multiplexer (MUX) 380 to generate and transmit an MP TS.

The single-program encoder 310 includes a video encoder 320, an audio encoder 330, packetizers 340 and 350, and a multiplexer (MUX) 360.

The video encoder 320 and the audio encoder 330 encode uncompressed video data and uncompressed audio data, respectively, to generate and output a video ES and an audio ES, respectively. The packetizers 340 and 350 of the single-program encoder 310 packetize the video ES and the audio ES, respectively, and insert PES headers into the packetized video ES and the packetized audio ES, respectively, to generate a video PES packet and an audio PES packet, respectively.

The MUX 360 multiplexes the video PES packet, the audio PES packet, and a variety of additional data to generate a first single-program transport stream SP TS1. PMT information may be multiplexed with the video PES packet and the audio PES packet and included in the first single-program transport stream SP TS1. PMT information is inserted into each single-program transport stream and describes a PID of each ES or additional data.

The MUX 380 multiplexes a plurality of single-program transport streams SP TS1, SP TS2, ... with PAT information to generate a multi-program transport stream MP TS.

The PMT information and the PAT information are generated by a PSI and Program and System Information Protocol (PSIP) generator 370.

The multi-program transport stream (MP TS) may include the PAT information and a PSIP. The PAT information describes PIDs of PMT information about single-program transport streams included in a multi-program transport stream.

Figure 4:
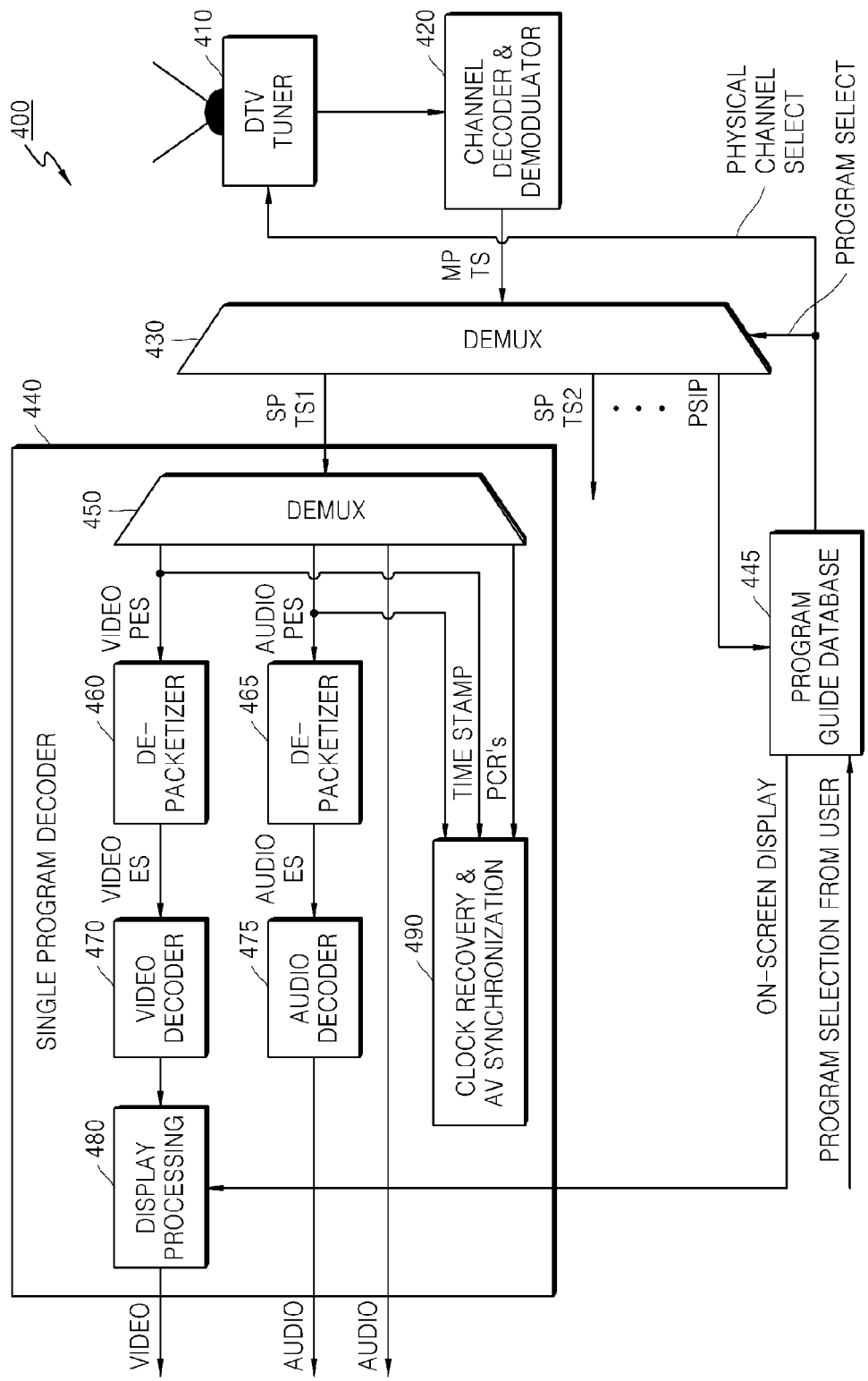
FIG. 4 is a block diagram of a digital TV receiving system for 2D contents services according to an exemplary embodiment.

FIG. 4 is a block diagram of a digital TV receiving system 400 for 2D contents services according to an exemplary embodiment.

The digital TV receiving system 400 receives a digital broadcasting stream and extracts video data, audio data, and additional data from the digital broadcasting stream.

A digital TV (DTV) tuner 410 is tuned to a wave frequency of a channel selected according to a physical channel select signal input by a viewer to selectively extract a signal received via a wave corresponding to the wave frequency. A channel decoder and demodulator 420 extracts a multi-program transport stream MP TS from a channel signal. The multi-program transport stream MP TS is demultiplexed into a plurality of single-program transport streams SP TS1, SP TS2, ... and a PSIP by a demultiplexer (DEMUX) 430.

A first single-program transport stream SP TS1 selected by a program select signal input by a viewer is decoded by a single-program decoder 440. The single-program decoder 440 operates reversely to the single-program encoder 310. A video PES packet, an audio PES packet, and additional data are restored from the first single-program transport stream SP TS1. The video PES packet and the audio PES packet are restored to ESs by depacketizers 460 and 465, respectively, and then the ESs are restored to video data and audio data by a video decoder 470 and an audio decoder 475, respectively. The video data may be converted into a displayable format by a display processor 480.

A clock recovery and audio/video (AV) synchronization device 490 may synchronize a video data reproduction time with an audio data reproduction time by using program clock reference (PCR) information and time stamp information extracted from the first single-program transport stream SP TS1.

A program guide database 445 may receive the program select signal input by a viewer, search for a channel and a program corresponding to the program select signal input by the viewer by comparing the program select signal with the PSIP extracted from the multi-program transport stream MP TS, and then transmit a channel selection input signal to the digital TV tuner 410 and a program selection input signal to the DEMUX 430. The program guide database 445 may also transmit on-screen display information to the display processor 480 and support an on-screen display operation.

Various exemplary embodiments in which the digital broadcasting stream transmitting apparatus 100 and the digital broadcasting stream receiving apparatus 200 transmit and receive 3D video information, linking information, and 3D additional information through a plurality of channels or a plurality of ESs in order to provide a 3D digital broadcasting service while maintaining compatibility with an MPEG TS-based digital broadcasting systems for providing 2D contents services will now be described with reference to FIGS. 5 through 11.

Hereinafter, a video stream may be a general term for video information such as video data, disparity information, depth information, or the like, and an ES, a PES packet, a single-program transport stream, and a multi-program transport stream that are results of conversions performed at different stages.

In the exemplary embodiments described below with reference to FIGS. 5 through 11, a stereo video stream including a left view video and a right view video is transmitted and received for convenience of explanation. However, the digital broadcasting stream transmitting apparatus 100 and the digital broadcasting stream receiving apparatus 200 may also be applied to multi-view video streams each including a reference view and at least one additional view, as in an exemplary embodiment of FIG. 12.

Figure 5:
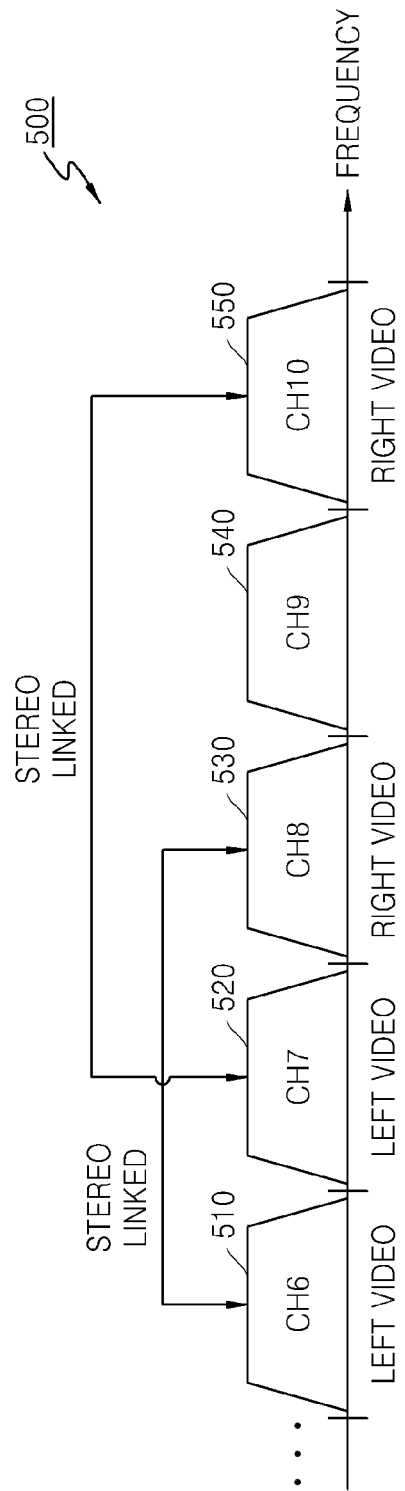
FIG. 5 illustrates an example of a distribution of a channel frequency band in which a plurality of video streams are transmitted and received via a plurality of channels, according to a first exemplary embodiment.

FIG. 5 illustrates an example of a distribution of a channel frequency band 500 in which a plurality of video streams can be transmitted and received via a plurality of channels, according to the above-described first exemplary embodiment.

In the channel frequency band 500, a frequency band is allocated to each of the plurality of channels. For example, the channel frequency band 500 includes a frequency band 510 for channel 6, a frequency band 520 for channel 7, a frequency band 530 for channel 8, a frequency band 540 for channel 9, and a frequency band 550 for channel 10.

A TS for left-view video information and a TS for right-view video information may be transmitted and received as a first stereo video through the frequency band 510 for channel 6 and the frequency band 530 for channel 8, respectively. In this case, linking information indicating existence of an association between videos of a stereo video, namely, indicating that the videos are stereo linked, may be set for channel 6 and channel 8. The linking information may be set between channels, TSs, or ESs.

A TS for left-view video information and a TS for right-view video information may be transmitted and received as a second stereo video through the frequency band 520 for channel 7 and the frequency band 550 for channel 10, respectively. In this case, linking information indicating existence of an association between videos of a stereo video, namely, indicating that the videos are stereo linked, may be set for channel 7 and channel 10.

Accordingly, in a method of allocating a stereo video stream to channels according to the first exemplary embodiment, a TS for a left-view video and a TS for a right-view video are transmitted via different channels, respectively.

Figure 6:
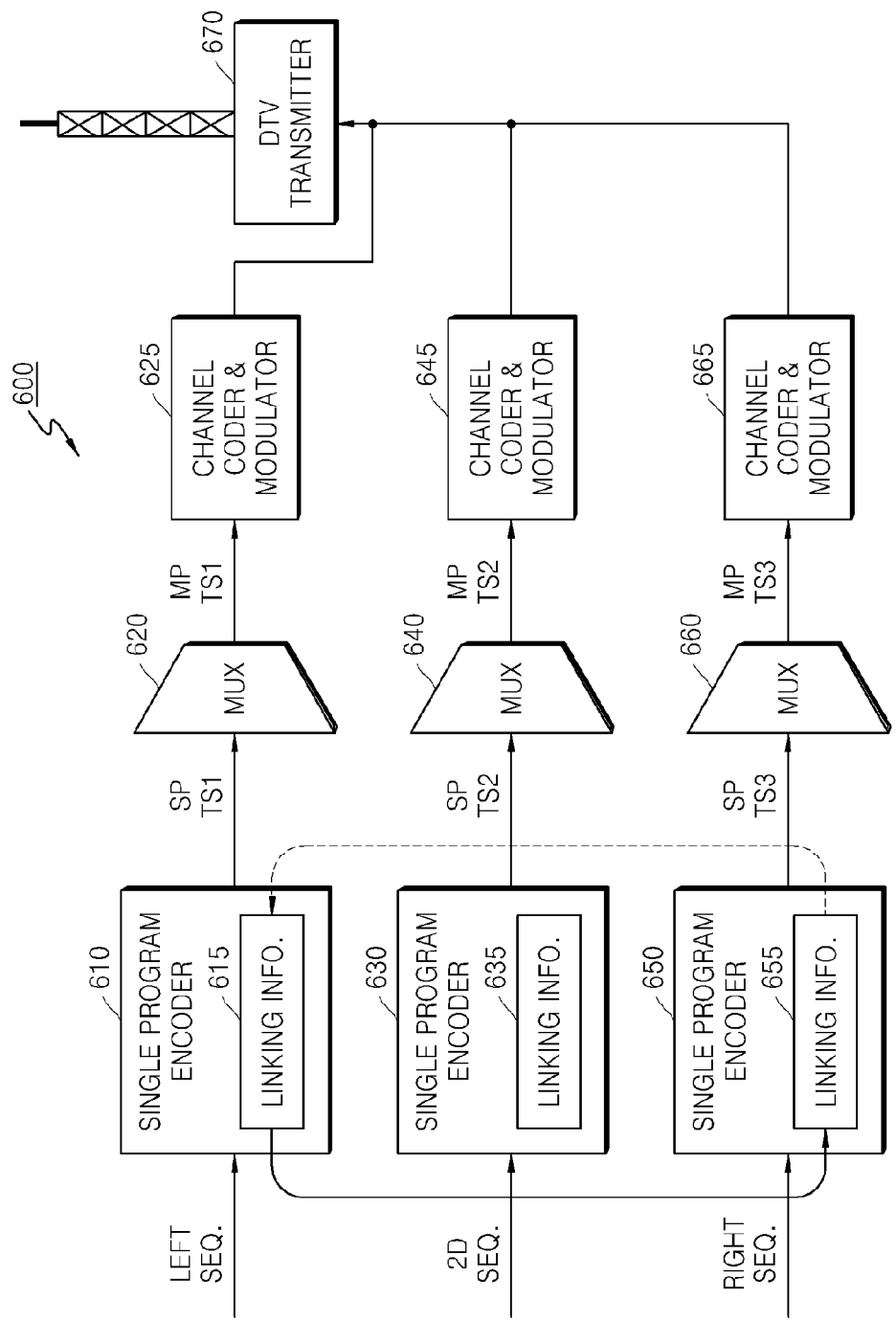
FIG. 6 is a block diagram of a digital broadcasting stream transmitting apparatus that transmits a 3D video stream including linking information via a plurality of channels according to the first exemplary embodiment illustrated in FIG. 5.

FIG. 6 is a block diagram of a digital broadcasting stream transmitting apparatus 600 that transmits a 3D video stream having linking information via a plurality of channels according to the first exemplary embodiment described above with reference to FIG. 5.

The digital broadcasting stream transmitting apparatus 600 corresponds to a block diagram of the digital broadcasting stream transmitting apparatus 100 that is constructed according to the first exemplary embodiment of FIG. 5. Operations of single-program encoders 610, 630, and 650 and MUXes 620, 640, and 660 of the digital broadcasting stream transmitting apparatus 600 correspond to operations of the ES generation unit 110 and the TS generation unit 120 of the digital broadcasting stream transmitting apparatus 100 that are performed according to the first exemplary embodiment. Operations of channel encoder and modulators 625, 645, and 665 and a DTV transmitter 670 of the digital broadcasting stream transmitting apparatus 600 correspond to an operation of the transmission unit 130 of the digital broadcasting stream transmitting apparatus 100 that is performed according to the first exemplary embodiment.

The single-program encoders 610, 630, and 650 may receive a left-view video sequence Left Seq., a 2D video sequence 2D Seq., and a right-view video sequence Right Seq. to generate and output a first single-program transport stream SP TS1, a second single-program transport stream SP TS2, and a third single-program transport stream SP TS3, respectively.

The first single-program transport stream SP TS1 for the left-view video sequence may be multiplexed by the MUX 620 to generate a first multi-program transport stream MP TS1. Similarly, the second single-program transport stream SP TS2 for the 2D video sequence and the third single-program transport stream SP TS3 for the right-view video sequence may be respectively multiplexed by the MUXes 640 and 660 to respectively generate a second multi-program transport stream MP TS2 and a third multi-program transport stream MP TS3.

The first multi-program transport stream MP TS1 may be encoded and modulated according to channel 6 (or channel 7) by the channel encoder and modulator 625. The third multi-program transport stream MP TS3 may be encoded and modulated according to channel 8 (or channel 10) by the channel encoder and modulator 665. The second multi-program transport stream MP TS2 may be encoded and modulated according to channel 9 by the channel encoder and modulator 645.

The DTV transmitter 670 may transmit a broadcasting video stream allocated to the plurality of channels. Thus, the digital broadcasting stream transmitting apparatus 600 and the digital broadcasting stream transmitting apparatus 100 according to the first exemplary embodiment may generate a single-program transport stream and a multi-program transport stream from each of a left-view video and a right-view video of a stereo video and a 2D video and transmit the single-program transport streams and the multi-program transport streams via a plurality of channels, respectively.

The single program encoder 610 for the left-view video may set linking information 615 for identifying the right-view video as corresponding to the left-view video. The single program encoder 650 for the right-view video may set linking Information 655 for identifying the left-view video as corresponding to the right-view video. If a video associated with the 2D video exists, the single program encoder 630 for the 2D video may set linking information 635 for identifying the associated video. Each linking information may be inserted into PMT information of a single-program transport stream.

According to the first exemplary embodiment, the digital broadcasting stream receiving apparatus 200 may selectively receive a TS for a left-view video of a stereo video, a TS for a right-view video of the stereo video, and a TS for a 2D video transmitted via different channels, and restore video data of a desired TS.

According to the first exemplary embodiment, the ES extraction unit 220 of the digital broadcasting stream receiving apparatus 200 may extract linking information. The reproduction unit 230 according to the first exemplary embodiment may identify a right-view video sequence corresponding to a left-view video sequence by using the linking information and thus perform 3D reproduction. The linking information may also be used by the ES extraction unit 220 when searching for a third single-program transport stream corresponding to a first single-program transport stream to extract ESs from the first and third single-program transport streams, respectively.

Figure 7:
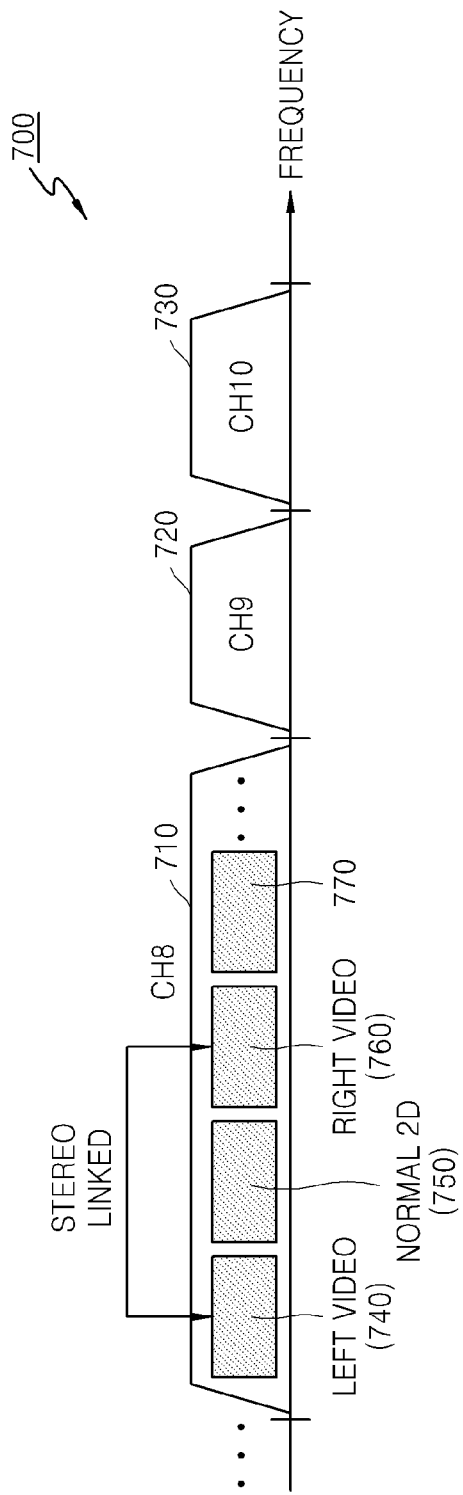
FIG. 7 illustrates an example of a distribution of a channel frequency band in which a plurality of TSs for a 3D video stream and a 2D video stream can be transmitted and received via a single channel, according to a second exemplary embodiment.

FIG. 7 illustrates an example of a distribution of a channel frequency band 700 in which a plurality of TSs for a 3D video stream and a 2D video stream can be transmitted and received via a single channel, according to the above-described second exemplary embodiment.

The channel frequency band 700 includes a frequency band 710 for channel 8, a frequency band 720 for channel 9, and a frequency band 730 for channel 10.

A TS 740 for left-view video information and a TS 760 for right-view video information may be transmitted and received as a stereo video through the frequency band 710 for channel 8. In this case, linking information indicating existence of an association between videos of a stereo video, namely, indicating that the videos are stereo linked, may be set between an ES for the left-view video information and an ES for the right-view video information or between an SP TS for the left-view video information and an SP TS for the right-view video information.

A TS 750 for a normal 2D video and another TS 770 may be transmitted and received through the frequency band 710 for channel 8.

Accordingly, in a method of allocating a stereo video stream to channels according to the second exemplary embodiment, a TS for a left-view video and a TS for a right-view video are transmitted via a single channel.

Figure 8:
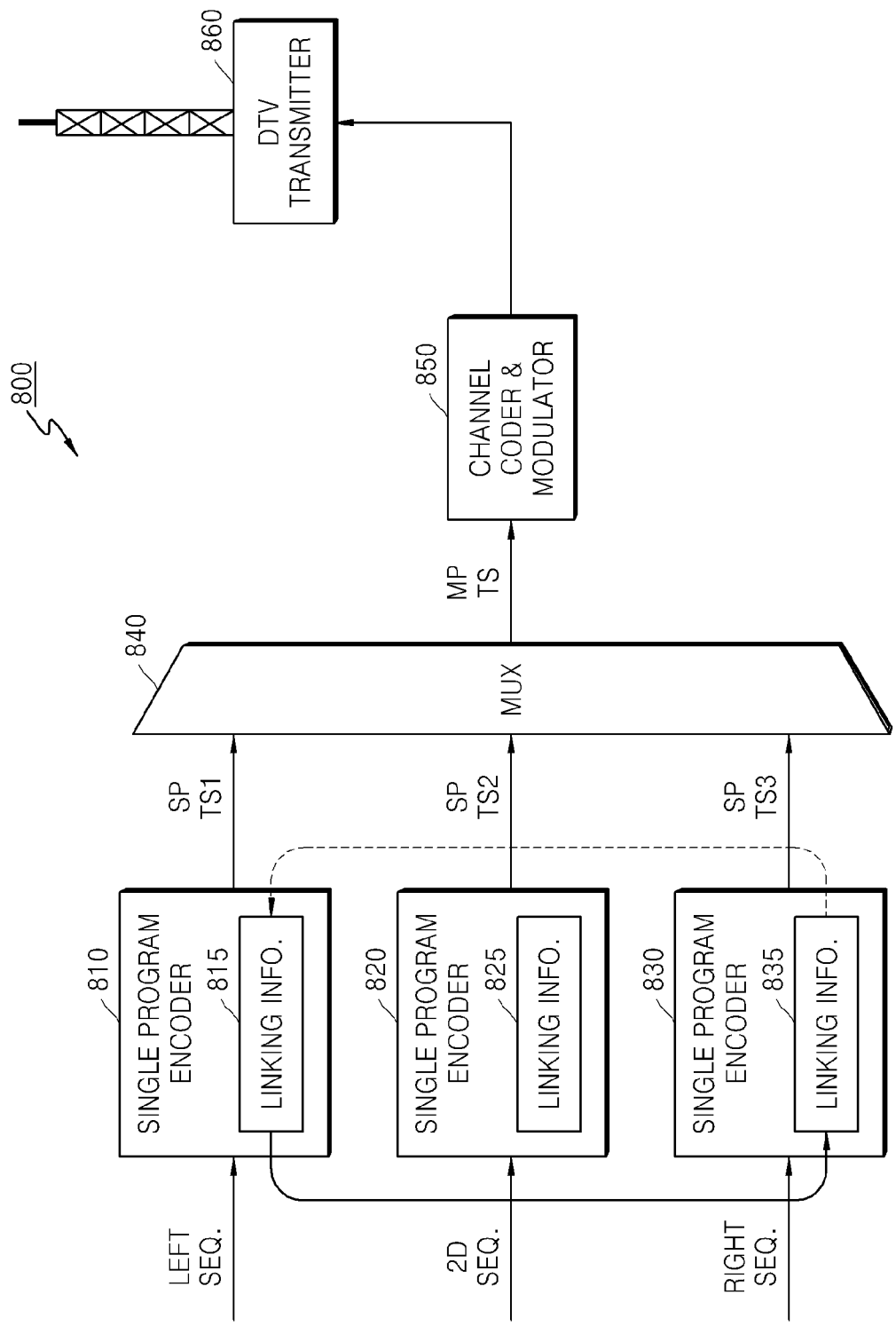
FIG. 8 is a block diagram of a digital broadcasting stream transmitting apparatus that transmits a plurality of TSs having linking information via a single channel according to the second exemplary embodiment illustrated in FIG. 7.

FIG. 8 is a block diagram of a digital broadcasting stream transmitting apparatus 800 that transmits a plurality of TSs having linking information via a single channel according to the second exemplary embodiment described above with reference to FIG. 7.

The digital broadcasting stream transmitting apparatus 800 corresponds to a block diagram of the digital broadcasting stream transmitting apparatus 100 that is constructed according to the second exemplary embodiment. In other words, operations of single-program encoders 810, 820, and 830 and a MUX 840 of the digital broadcasting stream transmitting apparatus 800 correspond to operations of the ES generation unit 110 and the TS generation unit 120 of the digital broadcasting stream transmitting apparatus 100 that are performed according to the second exemplary embodiment. Operations of a channel encoder and modulator 850 and a DTV transmitter 860 of the digital broadcasting stream transmitting apparatus 800 correspond to an operation of the transmission unit 130 of the digital broadcasting stream transmitting apparatus 100 that is performed according to the second exemplary embodiment.

The single-program encoders 810, 820, and 830 may receive a left-view video sequence Left Seq., a 2D video sequence 2D Seq., and a right-view video sequence Right Seq., respectively, to generate and output a first single-program transport stream SP TS1, a second single-program transport stream SP TS2, and a third single-program transport stream SP TS3, respectively.

The first single-program transport stream SP TS1, the second single-program transport stream SP TS2, and the third single-program transport stream SP TS3 may be multiplexed by the MUX 840 to generate a multi-program transport stream MP TS. In other words, the first, second, and third single-program transport streams SP TS1, SP TS2, and SP TS3 for the left-view video sequence, the 2D video sequence, and the right-view video sequence may be multiplexed together to generate a single multi-program transport stream MP TS The multi-program transport stream MP TS may be encoded and modulated according to channel 8 by the channel encoder and modulator 850. The DTV transmitter 860 may transmit a broadcasting video stream allocated to channel 8. Thus, the digital broadcasting stream transmitting apparatus 800 and the digital broadcasting stream transmitting apparatus 100 according to the second embodiment may multiplex a single-program transport stream for each of a left-view video of a stereo video, a right-view video of the stereo video, and a 2D video into a single multi-program transport stream and transmit the single multi-program transport stream via a single channel.

The single program encoder 810 for the left-view video may set linking information 815 for identifying the right-view video as corresponding to the left-view video and may insert the linking information 815 into PMT information of the first single-program transport stream SP TS1. The single program encoder 830 for the right-view video may set linking Information 835 for identifying the left-view video as corresponding to the right-view video and may insert the linking information 835 into PMT information of the third single-program transport stream SP TS3. If a video associated with the 2D video exists, the single program encoder 820 for the 2D video may set linking information 825 for identifying the associated video and may insert the linking information 825 into PMT information of the second single-program transport stream SP TS2.

The single program encoders 810, 820, and 830 according to the second exemplary embodiment may follow individual digital data communication systems. For example, an Advanced Television Systems Committee (ATSC) terrestrial broadcasting communication method supports Enhanced Vestigial Sideband (E-VSB) technology. In the E-VSB technology, a TS may be constructed in a different way from that in the MPEG technology. For example, since linking information according to an exemplary embodiment is inserted into a TS to be transmitted, a base-view video stream may be transmitted in the form of an MPEG transport stream, and an additional-view video stream may be transmitted in the form of an E-VSB transport stream.

The single program encoders 810, 820, and 830 according to the second exemplary embodiment may follow individual video encoding systems. Since the linking information according to an exemplary embodiment is inserted into PMT information of a TS, a base-view video may be encoded according to an MPEG-2 video encoding method, and an additional-view video may be encoded according to an MPEG Advanced Video Coding (AVC)/H.264 video encoding method.

According to the second exemplary embodiment, the digital broadcasting stream receiving apparatus 200 may receive a single multi-program transport stream for a left-view video of a stereo video, a right-view video of the stereo video, and a 2D video transmitted via a single channel, demultiplex the single multi-program transport stream into a single-program transport stream for the left-view video, a single-program transport stream for the right-view video, and a single-program transport stream for the 2D video, and extract at least one from the single-program transport streams, thereby restoring desired video sequence data.

According to the second exemplary embodiment, the ES extraction unit 220 of the digital broadcasting stream receiving apparatus 200 may extract linking information. The reproduction unit 230 according to the second exemplary embodiment may identify a right-view video sequence corresponding to a left-view video sequence by using the linking information and thus perform 3D reproduction. The linking information may also be used by the ES extraction unit 220 when searching for a third single-program transport stream corresponding to a first single-program transport stream and extracting ESs from the first and third single-program transport streams, respectively.

Figure 9:
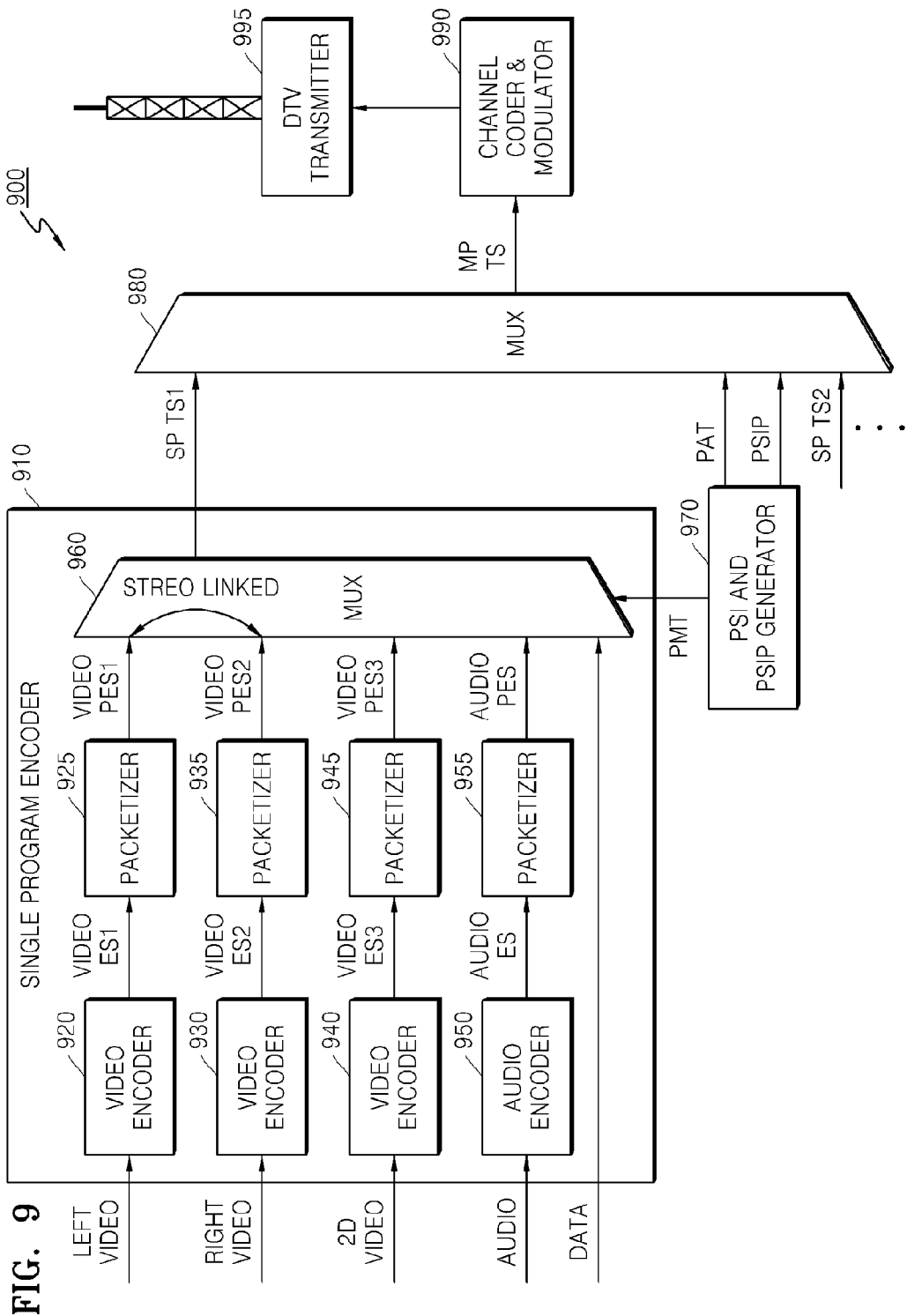
FIG. 9 is a block diagram of a digital broadcasting stream transmitting apparatus that transmits a single TS including a 3D video stream and a 2D video stream via a single channel according to a third exemplary embodiment.

FIG. 9 is a block diagram of a digital broadcasting stream transmitting apparatus 900 that transmits a single TS including a 3D video stream and a 2D video stream via a single channel according to the above-described third exemplary embodiment.

The digital broadcasting stream transmitting apparatus 900 corresponds to a block diagram of the digital broadcasting stream transmitting apparatus 100 that is constructed according to the third exemplary embodiment. In other words, operations of a single-program encoder 910 and a MUX 980 of the digital broadcasting stream transmitting apparatus 900 correspond to operations of the ES generation unit 110 and the TS generation unit 120 of the digital broadcasting stream transmitting apparatus 100 that are performed according to the third exemplary embodiment. Operations of a channel encoder and modulator 990 and a DTV transmitter 995 of the digital broadcasting stream transmitting apparatus 900 correspond to an operation of the transmission unit 130 of the digital broadcasting stream transmitting apparatus 100 that is performed according to the third exemplary embodiment.

The single-program encoder 910 may receive a left-view video, a right-view video, and a 2D video and generate a first video elementary stream Video ES1, a second video elementary stream Video ES2, and a third video elementary stream Video ES3 by using video encoders 920, 930, and 940, respectively. The first, second, and third video elementary streams Video ES1, Video ES2, and Video ES3 are packetized into a first video PES packet Video PES1, a second video PES packet Video PES2, and a third video PES packet Video PES3 by packetizers 925, 935, and 945, respectively.

The single program encoder 910 may receive audio, convert the audio into an audio elementary stream Audio ES by using an audio encoder 950, and convert the audio elementary stream Audio ES into an audio PES packet Audio PES by using a packetizer 955.

A MUX 960 of the single program encoder 910 may multiplex the first, second, and third video PES packets and the audio PES packet into a first single-program transport stream SP TS1. The single program encoder 910 may also receive PMT information generated by a PSI and PSIP generator 970 and a variety of additional data DATA and multiplex the PMT information and the additional data DATA together with the first, second, and third video PES packets and the audio PES packet by using the MUX 960, so that the PMT information and the additional data DATA are inserted into the first single-program transport stream SP TS1. The first single-program transport stream SP TS1 may then be output.

At least one of the 3D video data and other 2D video data may be multiplexed with PMT information into a second single-program transport stream SP TS2. The PSI and PSIP generator 970 may generate PAT information including PIDs of the PMT information included in the first and second single-program transport streams SP TS1 and SP TS2, and a PSIP about various programs and system information. A MUX 980 may multiplex the first and second single-program transport streams SP TS1 and SP TS2, the PAT information, and the PSIP into a single multi-program transport stream MP TS.

The multi-program transport stream MP TS may be encoded and modulated according to a channel by the channel encoder and modulator 990. The DTV transmitter 995 may transmit a broadcasting video stream allocated to the channel. Thus, the digital broadcasting stream transmitting apparatus 900 and the digital broadcasting stream transmitting apparatus 100 according to the third exemplary embodiment may multiplex ESs for all of a left-view video of a stereo video, a right-view video of the stereo video, and a 2D video into a single single-program transport stream, and transmit a single multi-program transport stream via a single channel.

The single program encoder 910 may set linking information for identifying a left-view video or a right-view video corresponding to each other as videos of a stereo video, namely, indicating that the videos are stereo linked, to the first or second video PES packet, respectively, and may insert the stereo linked into PMT information of the first single-program transport stream SP TS1.

The single program encoder 910 according to the third exemplary embodiment may generate a TS according to independent digital data communication methods. For example, the first single-program transport stream SP TS1 may be generated in the form of an MPEG transport stream, the second single-program transport stream SP TS2 may be transmitted in the form of an E-VSB transport stream, and linking information may be inserted into each of the PMT information of the first and second single-program transport streams SP TS1 and SP TS2. The video encoders 920 and 930 according to the third exemplary embodiment may follow independent video encoding methods. For example, a base-view video may be encoded according to an MPEG-2 video encoding method, an additional-view video may be encoded according to an MPEG AVC/H.264 video encoding method, and linking information may be inserted into each of the PMT information of the first and second single-program transport streams SP TS1 and SP TS2.

According to the third exemplary embodiment, the digital broadcasting stream receiving apparatus 200 may extract a single multi-program transport stream for a left-view video of a stereo video, a right-view video of the stereo video, a 2D video, and audio transmitted via a single channel, and demultiplex the single multi-program transport stream, thereby selecting and extracting a desired single-program transport stream. In addition, the digital broadcasting stream receiving apparatus 200 according to the third exemplary embodiment may select and extract a video ES for the left-view video of the stereo video, a video ES for the right-view video of the stereo video, and a video ES for the 2D video from the extracted single-program transport stream, thereby restoring desired video data.

According to the third exemplary embodiment, the ES extraction unit 220 of the digital broadcasting stream receiving apparatus 200 may extract linking information. The reproduction unit 230 according to the third exemplary embodiment may identify right-view video data corresponding to left-view video data by using the linking information and thus accurately reproduce a 3D video. The linking information may also be used by the ES extraction unit 220 when searching for and extracting a second video ES corresponding to a first video ES.

Figure 10:
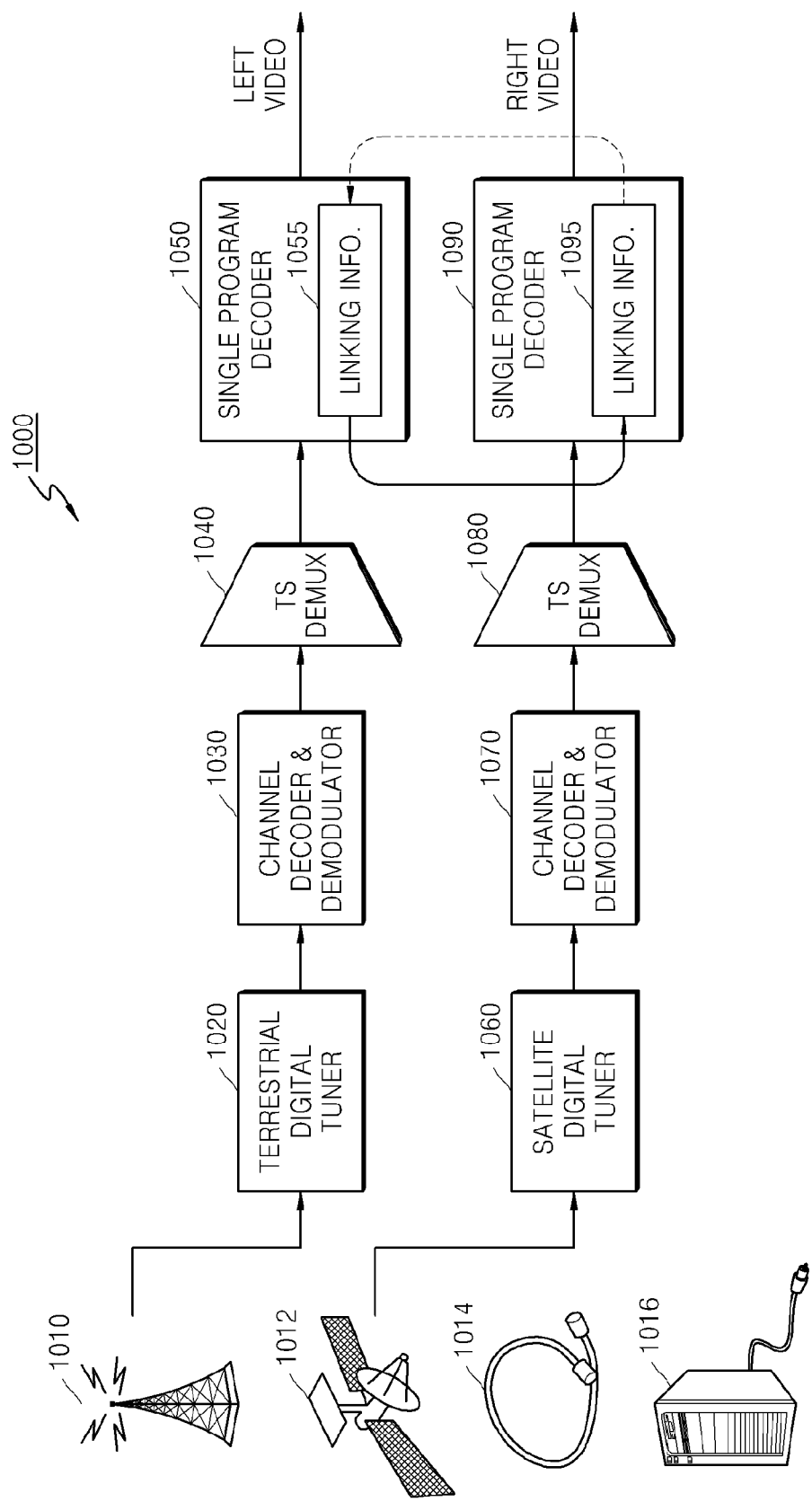
FIG. 10 is a block diagram of a digital broadcasting stream receiving apparatus that receives a plurality of TSs via a plurality of channels corresponding to a plurality of transmission network systems according to a fourth exemplary embodiment.

FIG. 10 is a block diagram of a digital broadcasting stream receiving apparatus 1000 that receives a plurality of TSs via a plurality of channels based on a plurality of transmission network systems according to the above-described fourth exemplary embodiment.

According to the fourth exemplary embodiment, the digital broadcasting stream transmitting apparatus 100 receives a TS for a left-view video and a TS for a right-view video via different channels that are based on individual transmission network system, for example, a terrestrial system 1010, a satellite TV system 1012, a cable TV system 1014, an Internet Protocol Television (IPTV) system 1016, and the like.

The digital broadcasting stream receiving apparatus 1000 corresponds to a block diagram of the digital broadcasting stream receiving apparatus 200 that is constructed according to the fourth exemplary embodiment. In other words, operations of either a terrestrial digital tuner 1020 or a satellite digital tuner 1060 and channel decoder and demodulators 1030 and 1070 of the digital broadcasting stream receiving apparatus 1000 may correspond to an operation of the TS receiving unit 210 of the digital broadcasting stream receiving apparatus 200 that is performed according to the fourth exemplary embodiment, and operations of TS DEMUXes 1040 and 1080 and single-program decoders 1050 and 1090 of the digital broadcasting stream receiving apparatus 1000 may correspond to an operation of the ES extraction unit 220 of the digital broadcasting stream receiving apparatus 200 that is performed according to the fourth exemplary embodiment.

The digital broadcasting stream receiving apparatus 1000 may be a digital TV receiving system. The digital broadcasting stream receiving apparatus 1000 may receive broadcasting streams via channels corresponding to the terrestrial system 1010, the satellite TV system 1012, the cable TV system 1014, and the IPTV system 1016.

The terrestrial digital tuner 1020 and the channel decoder and demodulator 1030 are tuned to a terrestrial channel to extract a multi-program transport stream received via terrestrial waves. In this case, a TS for a left-view video of a stereo video may be received via the terrestrial channel.

The satellite digital tuner 1060 and the channel decoder & demodulator 1070 are tuned to a satellite channel to extract a multi-program transport stream received via satellite waves. In this case, a TS for a right-view video of the stereo video may be received via the satellite channel.

The multi-program transport streams may be demultiplexed into single-program transport streams by the TS DEMUXes 1040 and 1080. The single-program transport streams may be restored to a left-view video and a right-view video by the single-program decoders 1050 and 1090, respectively.

In this case, the single-program transport stream for the left-view video received and extracted via the terrestrial channel may include linking information 1055 about the right-view video constituting a remaining view of a stereo image. In this case, linking information of the left-view video may include an identifier indicating a channel, a TS, or an ES of the right-view video received via the satellite channel.

The single-program transport stream for the right-view video received and extracted via the satellite channel may include linking information 1095 about the left-view video. Linking information of the right-view video may include an identifier indicating a channel, a TS, or an ES of the right-view video received via the terrestrial channel.

The digital broadcasting stream receiving apparatus 1000 may detect the left-view video and the right-view video received via the terrestrial channel and the satellite channel, respectively, by using the linking information to reproduce a 3D video, thereby providing 3D video broadcasting services.

Figure 11:
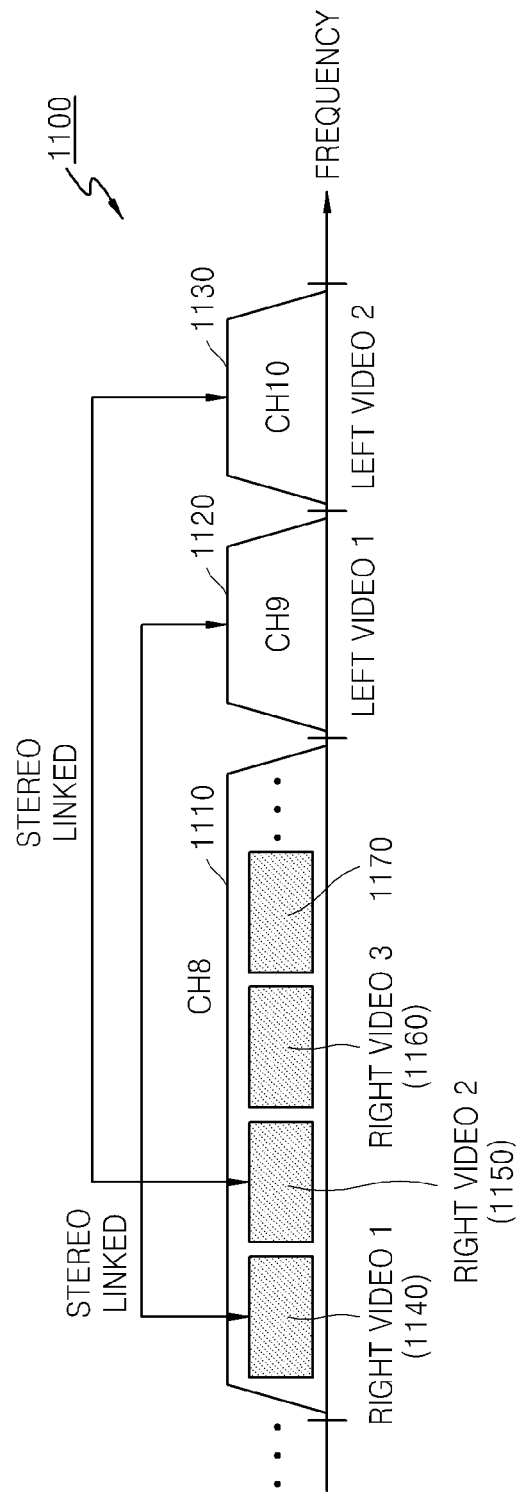
FIG. 11 illustrates an example of a distribution of a channel frequency band in which a plurality of TSs for a base-view video stream of a 3D video can be transmitted and received via a plurality of channels and in which a single TS for an additional-view video stream for the 3D video can be transmitted and received via a single channel, according to a fifth exemplary embodiment.

FIG. 11 illustrates an example of a distribution of a channel frequency band 1100 in which a plurality of TSs for a left-view video stream of a 3D video can be transmitted and received via a plurality of channels and in which a TS for a right-view video stream for the 3D video can be transmitted and received via a single channel, according to the above-described fifth exemplary embodiment.

The channel frequency band 1100 includes a frequency band 1110 for channel 8, a frequency band 1120 for channel 9, and a frequency band 1130 for channel 10.

According to the fifth exemplary embodiment, a left-view video Left Video 1 of a first stereo video and a left-view video Left Video 2 of a second stereo video are allocated to the frequency band 1120 for channel 9 and the frequency band 1130 for channel 10, respectively. A TS 1140 for a right-view video Right Video 1 of the first stereo video and a TS 1150 for a right-view video Right Video 2 of the second stereo video may be transmitted and received through the frequency band 1110 for channel 8.

In this case, linking information indicating existence of an association between videos of a stereo video, namely, indicating that the videos are stereo linked, may be set between channels (video streams) of the left-view video Left Video 1 and the right-view video Right Video 1 of the first stereo video and between channels (video streams) of the left-view video Left Video 2 and the right-view video Right Video 2 of the second stereo video.

Although not shown in FIG. 11, if another left-view video is allocated to another channel, a TS 1160 for another right-view video may be transmitted via the frequency band 1110 for channel 8. If the channel frequency band 1100 is sufficiently large, a TS 1170 for other data may be further transmitted.

Accordingly, the digital broadcasting stream transmitting apparatus 100 according to the fifth exemplary embodiment may multiplex an ES for at least one left-view video to generate at least one single-program transport stream for the at least one left-view video, and generate at least one left-view multi-program transport stream from the at least one single-program transport stream. The digital broadcasting stream transmitting apparatus 100 according to the fifth exemplary embodiment may also multiplex an ES for at least one right-view video corresponding to the at least one left-view video to generate at least one single-program transport stream for the at least one right-view video, and generate a single right-view multi-program transport stream from the at least one single-program transport stream. Accordingly, the digital broadcasting stream transmitting apparatus 100 according to the fifth exemplary embodiment may transmit the at least one left-view multi-program transport stream and the single right-view multi-program transport stream via different channels.

The digital broadcasting stream receiving apparatus 200 according to the fifth exemplary embodiment may decode a plurality of channels to receive a left-view multi-program transport stream of a 3D video from at least one of the channels and receive a right-view multi-program transport stream of the 3D video from one of the channels. The digital broadcasting stream receiving apparatus 200 according to the fifth exemplary embodiment may demultiplex the at least one left-view multi-program transport stream individually to extract at least one left-view single-program transport stream, and demultiplex the at least one left-view single-program transport stream individually to extract at least one left-view elementary stream. The ES extraction unit 220 according to the fifth exemplary embodiment may demultiplex a single right-view multi-program transport stream to extract at least one right-view single-program transport stream, and demultiplex the at least one right-view single-program transport stream individually to extract at least one right-view elementary stream.

Accordingly, the digital broadcasting stream receiving apparatus 200 according to the fifth exemplary embodiment may extract a plurality of ESs for 3D video information or 2D video information via a plurality of channels. In addition, the digital broadcasting stream receiving apparatus 200 according to the fifth exemplary embodiment may reproduce mutually associated stereo videos three-dimensionally by using linking information.

The first through fifth exemplary embodiments of the digital broadcasting stream transmitting apparatus 100 and the digital broadcasting stream receiving apparatus 200 have been described above with reference to FIGS. 5 through 11 in relation to a stereo video of a 3D video. However, it is understood that another exemplary embodiment is not limited to stereo images. For example, a 3D video may be a multi-view video including at least three view videos.

According to the above-described first through fifth exemplary embodiments, a plurality of video streams associated with one another may be transmitted or received via at least one channel and at least one TS.

According to the second and third exemplary embodiments, a left-view video stream and a right-view video stream associated with each other may be transmitted or received via a single channel. For example, a case where the second or third exemplary embodiment is implemented so as to maintain compatibility with related art 2D digital terrestrial broadcasting systems is supposed. When a 2D digital terrestrial broadcasting system transmits and receives a single video stream within a frequency band of around 19.38 Mbps at a first bitrate, the 2D digital terrestrial broadcasting system may transmit and receive a base-view video stream at a second bitrate lower than the first bitrate and an additional-view video stream at remaining bitrate in order to implement the second or third exemplary embodiment.

According to the second and third exemplary embodiments, both base-view video information and additional-view video information are transmitted and received via a single channel, and thus compatibility with existing broadcasting systems is possible without using additional channels. When video data is compressed using a high-compressibility encoding and decoding method, data loss due to compression of a base-view video stream is minimized, and the base-view video stream may be transmitted and received via a single channel together with additional-view video information.

According to the first, fourth, and fifth exemplary embodiments, a base-view video stream and an additional-view video stream may be transmitted and received via a plurality of channels. For example, if the first, fourth, or fifth exemplary embodiment is implemented to allow maintaining of compatibility with related art 2D digital terrestrial broadcasting systems, a base-view video stream may be transmitted via an existing channel, and an additional-view video stream may be transmitted via an additional channel.

According to the first, fourth, and fifth exemplary embodiments, base-view video information and additional-view video information are transmitted and received via different channels, and thus if the first, fourth, and fifth exemplary embodiments are compatible with related art broadcasting systems on a channel-by-channel basis, multi-view digital contents broadcasting services may be provided without degradation of the quality of a displayed image.

Figure 12:
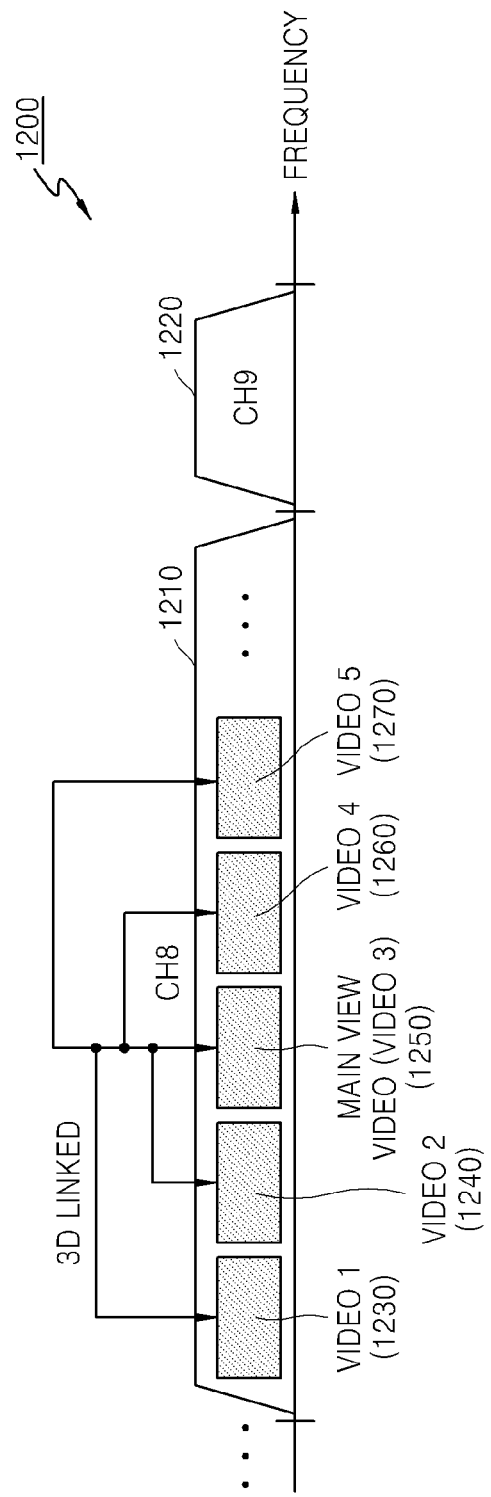
FIG. 12 illustrates an example of a distribution of a channel frequency band in which a plurality of TSs for a multi-view video stream can be transmitted and received via a single channel, according to an exemplary embodiment.

FIG. 12 illustrates an example of a distribution of a channel frequency band 1200 in which a plurality of TSs for a multi-view video stream can be transmitted and received via a single channel, according to an exemplary embodiment.

The channel frequency band 1200 includes a frequency band 1210 for channel 8 and a frequency band 1220 for channel 9, and the like.

According to the present exemplary embodiment, a TS 1230 for first view video information Video 1 of a multi-view video, a TS 1240 for second view video information Video 2 of the multi-view video, a TS 1250 for third view video information Video 3 of the multi-view video, a TS 1260 for fourth view video information Video 4 of the multi-view video, and a TS 1270 for fifth view video information Video 5 of the multi-view video may be transmitted and received through the frequency band 1210 for channel 8.

If the third view video information Video 3 is a main view video, linking information '3d linked' for representing that a link exists between each of the first, second, fourth, and fifth view video information Video 1, Video 2, Video 4, and Video 5 and the third view video information Video 3, may be set.

The digital broadcasting stream transmitting apparatus 100 according to the present exemplary embodiment for achieving multi-view video services may convert ESs of videos of a plurality of views that constitute a multi-view video, into single-program transport streams, respectively, multiplex the single-program transport streams for the respective views into a single multi-program transport stream, and transmit the single multi-program transport stream via a single channel. Hereinafter, the videos of the plurality of views are referred to as a plurality of view videos.

The digital broadcasting stream receiving apparatus 200 according to the present exemplary embodiment for achieving multi-view video services may decode a single channel to extract a single multi-program transport stream, and may demultiplex the single multi-program transport stream to extract respective single-program transport streams for a plurality of view videos. The plurality of view videos constitute a multi-view video, and respective ESs for the view videos may be extracted from the single-program transport streams for the view videos. Accordingly, the digital broadcasting stream receiving apparatus 200 according to the present exemplary embodiment may finally extract the single-program transport streams of the view videos and the ESs of the view videos via a single channel and thus reproduce restored view videos.

Since the digital broadcasting stream transmitting apparatus 100 according to the exemplary embodiment of FIG. 1 transmits mutually associated pieces of video information via different channels, TSs, or ESs, the digital broadcasting stream receiving apparatus 200 according to the exemplary embodiment of FIG. 2 may check what channel, TS, or ES video information associated with extracted video information has been received through. To this end, the digital broadcasting stream transmitting apparatus 100 and the digital broadcasting stream receiving apparatus 200 according to the exemplary embodiments of FIGS. 1 and 2 use linking information representing association between 3D videos such as stereo videos or multi-view videos.

Since the digital broadcasting stream transmitting apparatus 100 according to the exemplary embodiment of FIG. 1 converts mutually associated pieces of 3D video information into a transmission format and transmits the mutually associated 3D video information pieces in the transmission format, the digital broadcasting stream receiving apparatus 200 according to the exemplary embodiment of FIG. 2 may ascertain the features of a 3D video in order to properly restore the mutually associated 3D video information pieces into a 3D reproduction format and reproduce the mutually associated 3D video information pieces in the 3D reproduction format. Accordingly, the digital broadcasting stream transmitting apparatus 100 and the digital broadcasting stream receiving apparatus 200 according to the exemplary embodiments of FIGS. 1 and 2 use a 3D video start descriptor or a 3D video registration descriptor for representing existence or absence of 3D video information, and a 3D video stream descriptor for accurate restoration and reproduction of the 3D video information.

Exemplary embodiments in which the digital broadcasting stream transmitting apparatus 100 of FIG. 1 and the digital broadcasting stream receiving apparatus 200 of FIG. 2 transmit and receive linking information, a 3D video start descriptor or a 3D video registration descriptor, and a 3D video stream descriptor by using PSI will now be described with reference to Tables 1 through 18.

The linking information according to an exemplary embodiment may include a link identifier representing whether associated pieces of video information exist in a plurality of pieces of video information included in a TS, and a link descriptor used to identify an ES, a TS, or a channel of video information associated with each video information.

The TS generation unit 120 of the digital broadcasting stream transmitting apparatus 100 of FIG. 1 may insert the link identifier according to an exemplary embodiment into PAT information. The ES extraction unit 220 of the digital broadcasting stream receiving apparatus 200 of FIG. 2 checks a link identifier included in PAT information extracted from a TS and predict a link between pieces of PMT information included in the TS. Mutually associated pieces of PMT information include a link descriptor that defines a link between pieces of video information.

For example, parameter 'linked_indicator' including a link identifier may be additionally set for each PMT information within the PAT information. If parameter 'linked_indicator' of current PMT information is 000, no PMT information from among at least one piece of opponent PMT information indicated by the PAT information is associated with the current PMT information. On the other hand, if parameter 'linked_indicator' of the current PMT information is one among 001 to 111, PMT information including parameter 'linked_indicator' with the same value as that of the current PMT information, from among the at least one piece of opponent PMT information indicated by the PAT information, is associated with the current PMT information. In other words, PMT information pieces including parameters 'linked_indicator' with the same value may each include a link descriptor that defines a link therebetween.

The TS generation unit 120 of the digital broadcasting stream transmitting apparatus 100 of FIG. 1 may insert a link describer according to an exemplary embodiment into PMT information. The link describer may be set for each video information. The ES extraction unit 220 of the digital broadcasting stream receiving apparatus 200 of FIG. 2 may check a link describer included in PMT information extracted from a single-program transport stream and determine a location of opponent video information corresponding to the video information included in the single-program transport stream. Thus, the digital broadcasting stream receiving apparatus 200 of FIG. 2 may detect mutually associated pieces of video information and restore video data from the mutually associated video information pieces.

Table 1 shows an example of a syntax of parameter 'program_stream_map( )' of PMT information. The link describer according to an exemplary embodiment is included in parameter 'linking_descriptor'. The parameter 'linking_descriptor' may be included in parameter 'descriptor( )' as a descriptor region following parameter 'elementary_stream_info_length' included in parameter 'program_stream_map( )'.

TABLE 1

| Syntax |
| --- |
| Program_stream_map( ) { |
|     packet_start_code_prefix |
|     map_stream_id |
|     program_stream_map_length |
|     current_next_indicator |
|     reserved |
|     program_stream_map_version |
|     reserved |
|     marker_bit |
|     program_stream_info_length |
|     for (i = 0; i < N; i++) { |
|         descriptor( ) |
|     } |
|     elementary_stream_map_length |
|     for(i = O; i < N1; i++) { |
|         stream_type |
|         elementary_stream_id |
|         elementary_stream_info_length |
|         for (i = 0; i < N2; i++){ |
|             descriptor( ) |
|         } |
|     } |

TABLE 1-continued

| Syntax |
| --- |
|     CRC_32 |
| } |

The TS generation unit 120 of the digital broadcasting stream transmitting apparatus 100 of FIG. 1 may insert a 3D video start descriptor or a 3D video registration descriptor according to an exemplary embodiment, as 3D video authentication information, into a PMT. The ES extraction unit 220 of the digital broadcasting stream receiving apparatus 200 of FIG. 2 may check a 3D video start descriptor or a 3D video registration descriptor included in PMT information extracted from a single-program transport stream, and predict whether video information of an ES for the single-program transport stream is information about a 3D video. In addition, if it is determined based on the 3D video start descriptor or the 3D video registration descriptor that a 3D video stream descriptor is included in the PMT information, the ES extraction unit 220 may extract the 3D video stream descriptor from the PMT information and extract 3D video information from the ES.

Parameter '3d_start_descriptor' used to set a 3D video start descriptor or parameter '3d_registration_descriptor' used to set a 3D video registration descriptor may be included in parameter 'descriptor( )', which is a descriptor region following parameter 'program_stream_info_length' included in the PMT of Table 1.

Table 2 shows an example of a syntax of parameter '3d_start_descriptor' that represents the 3D video start descriptor.

TABLE 2

| Syntax |
| --- |
| 3d_start_descriptor( ){ |
|     descriptor_tag |
|     descriptor_length |
|     threed_info_start_code - |
| } |

Descriptors defined by a user may be inserted into a parameter 'descriptor_tag' having a value between 64~255, in a descriptor region of an MPEG TS. For example, the TS generation unit 120 of the digital broadcasting stream transmitting apparatus 100 of FIG. 1 may insert parameter '3d_start_descriptor', representing the 3D video start descriptor, into a descriptor region having parameter 'descriptor_tag' with a value of 0xF0.

Parameter 'descriptor_length' represents the number of bytes that follow parameter 'descriptor_length'. ASCII code '3DAV' may be set as the value of parameter 'threed_info_start_code' so that 3D video information is included in the single-program transport stream and a 3D video stream descriptor is included in PMT information.

Table 3 shows an example of a syntax of parameter '3d_registration_descriptor' that represents a 3D video registration descriptor.

TABLE 3

| Syntax |
| --- |
| 3d_registration_descriptor( ){ |
|     descriptor_tag |

TABLE 3-continued

```
Syntax descriptor_length
    format_identifier
    for(i = 0 ; i < N; i++){
       private_data_byte
    }
}
```

ASCII code '3DAV' may be set as the value of parameter 'format_identifier' so that parameter 'format_identifier' represents that 3D video format data is included in the single-program transport stream and a 3D video stream descriptor is included in the PMT.

Table 4 shows an example of a syntax of parameter 'linking_descriptor' that represents a link descriptor.

TABLE 4

```
Syntax linking_descriptor( ){
    descriptor_tag
    descriptor_length
    linking_priority
    distribution_indicator_flag
    channel_indicator_flag
    pmt_indicator_flag
    simulcast_flag
    Reserved
    if(distribution_indicator_flag){
         linked_distribution_method
    }
    if(channel_indicator_flag){
         linked_ts_id
         linked_channel
    }
    if(pmt_indicator_flag){
         linked_pmt_pid
         Reserved
    }
    linked_stream_PID
    if(simulcast_flag){
         linked_service_identification_time
    }
    Reserved
}
```

Parameter 'linking_priority' represents linking priority information that indicates existence or absence of a link between a plurality of video streams and priority between associated video streams. An exemplary embodiment of the values of parameter 'linking_priority' that define a link between a current video stream and an opponent video stream associated with the current video stream is based on Table 5.

TABLE 5

| linking_priority | | Description |
|---|---|---|
| 00 | no linking | The two video streams are not linked with each other. |
| 01 | linking_no_priorty | The two video streams are linked with each other, but they are equal to each other without priority. |
| 10 | linking_high_priorty | The current video stream is linked with the opponent video stream and has higher priority than the opponent video stream. |
| 11 | linking_low_priorty | The current video stream is linked with the opponent video stream and has lower |

TABLE 5-continued

| linking_priority | Description |
|---|---|
| | priority than the opponent video stream. |

If the value of parameter 'linking_priority' is 00, the two video streams are not linked to each other.

If the value of parameter 'linking_priority' is 01, the two video streams are equally linked to each other without priorities. In this case, when two video streams are independently encoded to have an equal relationship as in the first exemplary embodiment, the value of parameter 'linking_priority' may be set to be 01 for each channel.

When a reference view and an additional view of a stereo video are accurate, the value of parameter 'linking_priority' may be set to be 10 or 11. When the value of parameter 'linking_priority' is 10, the current video stream has higher priority than the opponent video stream. When the value of parameter 'linking_priority' is 11, the current video stream has lower priority than the opponent video stream. In other words, when the current video stream includes video information of the reference view, the value of parameter 'linking_priority' may be set to be 10. When the current video stream includes video information of the additional view, the value of parameter 'linking_priority' may be set to be 11.

Parameter 'distribution_indicator_flag' represents same transmission network method information that indicates whether mutually associated video streams are transmitted and received using the same transmission network method.

For example, when the value of parameter 'distribution_indicator_flag' is 0, it may indicate that the mutually associated video streams are transmitted and received using the same transmission network method. When the value of parameter 'distribution_indicator_flag' is 1, it may indicate that the mutually associated video streams are transmitted and received using different transmission network methods.

Parameter 'channel_indicator_flag' represents same channel information that indicates whether mutually associated pieces of video information are transmitted via the same channel.

For example, when the value of parameter 'channel_indicator_flag' is 0, it may indicate that the mutually associated video streams use the same channel. When the value of parameter 'channel_indicator_flag' is 1, it may indicate that the mutually associated video streams use different channels. In the second and third exemplary embodiments where left-view video information and right-view video information linked to each other are transmitted via a single channel as described above with reference to FIGS. 7, 8, and 9, the value of parameter 'channel_indicator_flag' may be set to be 0. In the other exemplary embodiments, the value of parameter 'channel_indicator_flag' may be set to be 1.

Parameter 'pmt_indicator_flag' represents same single-program transport stream information that represents whether the mutually associated video streams exist within the same single-program transport stream.

For example, when the value of parameter 'pmt_indicator_flag' is 0, it may indicate that the mutually associated video streams such as ESs, PESs, or the like exist within the same single-program transport stream. When the value of parameter 'pmt_indicator_flag' is 1, it may indicate that the mutually associated video streams such as ESs, PESs, or the like exist within different single-program transport streams, respectively. In the third exemplary embodiment described above with reference to FIG. 9 where left-view video information and right-view video information linked to each other are included in a single single-program, the value of parameter 'pmt_indicator_flag' may be set to be 0. In other exemplary embodiments, the value of parameter 'pmt_indicator_flag' may be set to be 1.

Parameter 'simulcast_flag' represents same view information that represents whether mutually associated video streams of the same view exist.

For example, when the value of parameter 'simulcast_flag' is 0, it may indicate that mutually associated video streams exist as video information of the same view. When the value of parameter 'simulcast_flag' is 1, it may indicate that mutually associated video streams do not exist at the same point of time but data may be provided later.

Parameter 'linked_distribution_method' represents linked video transmission network method information that represents the transmission network method of a channel through which the opponent video stream is transmitted. When the value of parameter 'distribution_indicator_flag' representing the same transmission network method information is 1, the linked video transmission network method information may be set to define a transmission network method for the opponent video stream. Table 6 shows an example of the linked video transmission network method information.

TABLE 6

| linked_distribution_method | Description |
| --- | --- |
| 0x00 | terrestrial broadcasting |
| 0x01 | satellite broadcasting |
| 0x02 | cable broadcasting |
| 0x03 | IPTV broadcasting |
| 0x04~0xFF | reserved |

Parameter 'linked_ts_id' represents linked TS PID information that indicates a PID of a multi-program TS including mutually associated video streams.

Parameter 'linked_channel' represents linked video channel information that represents a channel through which an opponent video stream from among the mutually associated video streams is transmitted and received. When the value of parameter 'channel_indicator_flag' representing the same channel information is 1, the linked video channel information may be set.

In satellite broadcasting, terrestrial broadcasting, and cable broadcasting, frequency information may be provided as the linked video channel information. In IPTV broadcasting, Uniform Resource Locator (URL) information may be provided as the linked video channel information.

Parameter 'linked_pmt_pid' represents linked video PID information that indicates a PID of a PMT of a single-program transport stream through which the opponent video stream is transmitted. When the value of parameter 'pmt_indicator_flag' representing the same single-program transport stream information is 1, linked video packet identifier information may be defined.

Parameter 'linked_stream_PID' represents linked video stream PID information that indicates a PID of an opponent video stream from among the mutually associated video streams.

Parameter 'linked_service_identification_time' represents linked video service identifying time information that represents when a program for the opponent video stream from among the mutually associated video streams is provided. For example, the linked video service identifying time information may indicate, in units of months, days, hours, and minutes, when a linked program is provided.

The digital broadcasting stream transmitting apparatus 100 of FIG. 1 may transmit linking information such as a link descriptor, a link identifier, and the like for identifying existence and locations of the mutually associated video streams, together with the mutually associated video streams. The digital broadcasting stream receiving apparatus 200 of FIG. 2 may extract link information and video streams from a received TS and also extract mutually associated video streams according to the linking information, thereby properly reproducing 3D video.

An example in which a link descriptor is used between non-linked video streams is as follows. When the value of parameter 'linking_priority' representing link priority information is 00, since information used to identify an opponent video stream linked to a current video stream is not defined, the values of parameters 'distribution_indicator_flag', 'channel_indicator_flag', and 'pmt_indicator_flag' are set to be 0. The value of parameter 'linked_stream_PID' may be set to be a PID value newly defined for video information for an additional view video of a 3D video.

The PMT information according to an exemplary embodiment may include parameter 'linked_network_id' representing service provider information or broadcasting station information that provides a TS. In a data broadcasting system based on a Digital Video Broadcasting (DVB) method, a TS is identified using parameter 'transport_stream_id', and the service provider information or the broadcasting station information is identified using parameter 'original_network_id'. Thus, programs inserted into the TS may be securely distinguished from each other. Accordingly, when the digital broadcasting stream receiving apparatus 200 of FIG. 2 follows the DVB method, stereo link information may be accurately determined using parameter 'linked_network_id' instead of using parameter 'linked_channel'. The value of parameter 'linked_channel' denotes a channel of the opponent video information associated with the current TS, and may vary according to a broadcasting method or the type of a broadcasting system.

The link descriptor according to an exemplary embodiment is not limited to that shown in Table 4, and may be appropriately changed according to a case where the link descriptor is expanded to include a multi-view image or used for a predetermined purpose.

The linking information described up to now may be set for each video information. However, in cases where linking information about a link from an additional view to a reference view is not used, including cases where a single-program that can be selected by a user according to user inputs, system environments, communication environments, and the like is fixed to only the reference view, unidirectional linking information in which linking information is set for only base-view video information may be used.

The TS generation unit 120 of the digital broadcasting stream transmitting apparatus 100 of FIG. 1 may insert a 3D video stream descriptor for a current video stream into PMT information for the current video stream. The ES extraction unit 220 of the digital broadcasting stream receiving apparatus 200 of FIG. 2 may extract the 3D video stream descriptor from the PMT information for the current video stream. The 3D video stream descriptor includes additional information that is used when the reproduction unit 230 of the digital broadcasting stream receiving apparatus 200 of FIG. 2 performs 3D rendering to accurately restore and reproduce video data of the current video stream.

Table 7 shows parameter '3d_video_stream_descriptor' including a 3D video stream descriptor according to an exemplary embodiment.

TABLE 7

Syntax

```
3d_video_stream_descriptor(){
    descriptor_tag
    descriptor_length
    3d_video_property
    linked_stream_coding_mode
    full_image_size_indicator
    if(3d_video_property == 0x0f){
        3d_composite_format
        is_left_first
    }
    if(full_image_size_indicator == 0){
        additional_view_image_size
        scaling_method
        scaling_order
    }
    if(3d_video_property == 3D) {
        Is_Main
        picture_display_order
        view_info
    }
    else if(3d_video_property == 2D_Multi){
        view_index
    }
    es_icon_indicator
    transition_indicator
    transition_time_stamp
    transition_message
    Reserved
}
```

Parameter '3d_video_property' represents 3D video property information that represents video properties of the current video stream when a 3D video is constructed.

3D video property information according to an exemplary embodiment may be defined with reference to Table 8 below.

TABLE 8

| 3d_video_property | Description |
| --- | --- |
| 0x00 | Left video |
| 0x01 | Right video |
| 0x02 | 2D video |
| 0x03 | depth |
| 0x04 | disparity |
| 0x05 | 3D_DOT |
| 0x06 | 2D_Multi |
| 0x07~0x0e | reserved |
| 0x0f | 3d_composite_format |

When the value of parameter '3d_video_property' of the current video stream is 0x00, the current video stream is a left-view video of a stereo video. When the value of parameter '3d_video_property' of the current video stream is 0x01, the current video stream is a right-view video of the stereo video.

When the value of parameter '3d_video_property' of the current video stream is 0x02, the current video stream is a 2D video. When the value of parameter '3d_video_property' of the current video stream is 0x03 or 0x04, the current video stream is depth information or disparity information, respectively, of an additional-view video for the left-view video of the stereo video.

If the stereo video is constructed with 2D video information and depth information, the value of parameter '3d_video_property' of a video stream including the 2D video information may be set to be 0x02, and the value of parameter '3d_video_property' of a video stream including the depth information may be set to be 0x03.

When the value of parameter '3d_video_property' of the current video stream is 0x05, the 3D video is an image based on a 3D dot method or a random dot stereogram method. When the value of parameter '3d_video_property' of the current video stream is 0x06, the current video stream is a plurality of 2D video streams for a multi-view video.

When the value of parameter '3d_video_property' of the current video stream is 0x0f, the current video stream is a video stream in a 3D composite format that is obtained by composing a left-view image and a right-view image in a single frame, such as in a side-by-side format or a top-and-bottom format.

The other fields not defined in Table 8 may be reserved as reserved fields. Video formats of a new video property may be set in the reserved fields as a user demands. For example, a 3D composite format and a video format of a combination of depth information and disparity information may be allocated to reserved parameters as needed.

Parameter 'linked_stream_coding_mode' represents linked video encoding method information that represents a compressive encoding method between mutually associated pieces of video information. Linked video encoding method information according to an exemplary embodiment is set with reference to Table 9.

TABLE 9

| linked_stream_coding_mode | Description |
| --- | --- |
| 000 | independent coding |
| 001 | scalable coding |
| 010 | differential image coding |
| 011~111 | reserved |

When the value of parameter 'linked_stream_coding_mode' is 000, two mutually associated items of video data are independently encoded. In this case, the digital broadcasting stream transmitting apparatus 100 of FIG. 1 may compress the two video data items by using two independent video encoders, respectively, and transmit the two video data items in the form of two video streams. The digital broadcasting stream receiving apparatus 200 of FIG. 2 may receive the two video streams and restore video data from each of the two video streams by using two independent video decoders.

When the value of parameter 'linked_stream_coding_mode' is 001, the mutually associated video data items are encoded using a scalable coding method. When the value of parameter 'linked_stream_coding_mode' is 010, a differential image between a left-view image and a right-view image is encoded as additional-view video information.

Parameter 'full_image_size_indicator' represents size indicator information that indicates whether a current video stream transmits current video information at the original size of the original video information. For example, the size indicator information may represent a rate at which video data of the current video stream is scaled with respect to the original size of the original video data. When the value of parameter 'full_image_size_indicator' is 0, the size of current video data is not the same as the full size of the original video data. When the value of parameter 'full_image_size_indicator' is 1, the size of current video data is the same as the full size of the original video data.

Some polarization-type display devices halve the vertical resolution of an image and display an image with halved vertical resolution. Even when receiving 3D video data at a full resolution, the polarization type display devices halve the vertical resolution of the 3D video data and display an image with halved vertical resolution. Since full-resolution base-view video data and full-resolution additional-view video data do not need to be provided to these display devices, providing half-size video data obtained by halving a vertical resolution is efficient in terms of the amount of transmission data and a data processing rate.

A base-view video is transmitted at a full resolution in consideration of compatibility with broadcasting systems for 2D contents services, and an additional-view video is transmitted and received at a half size because it is used during 3D video reproduction, thereby efficiently transmitting and receiving a video stream. In addition, depth information and disparity information may be transmitted and received at a ½ or ¼ size, and not at a full size.

In a side-by-side format from among 3D composite formats, the size of a composite frame is an original size of a frame, and the sizes of a left-view frame and a right-view frame that constitute the composite frame may be reduced to a half size. Thus, in this case, the value of parameter 'full_image_size_indicator' is not 1. If each of the left-view frame and the right-view frame is constructed to have the full size of the original frame and thus the size of a 3D composite format frame is twice the size of the original frame, the value of parameter 'full_image_size_indicator' may be set to be 1.

When 3D video property information of the current video stream is a 3D composite format, that is, when the value of parameter '3d_video_property' represents '3d_composite_format', parameter '3d_composite_format' and parameter 'is_left_first' may be set as below.

Parameter '3d_composite_format' represents 3D composite format information that represents a method of constructing 3D composite format images by composing images corresponding to a left-view video and a right-view video. The 3D composite format information corresponds to the types of 3D composite formats as in Table 10.

TABLE 10

| 3d_composite_format | Description |
|---|---|
| 0x00 | Side by side format |
| 0x01 | Top and bottom format |
| 0x02 | vertical line interleaved format |
| 0x03 | horizontal line interleaved format |
| 0x04 | frame sequential format |
| 0x05 | field sequential format |
| 0x06 | checker board format |
| 0x07~0x7f | reserved |

When the value of parameter '3d_composite_format' of the current video stream is 0x00, the 3D composite format of current video data is a side-by-side format. Similarly, when the value of parameter '3d_composite_format' of the current video stream is 0x01, 0x02, 0x03, 0x04, 0x05, or 0x06, the 3D composite format of the current video data is a top-and-bottom format, a vertical line interleaved format, a horizontal line interleaved format, a frame sequential format, a field sequential format, or a checker board format, respectively.

The side-by-side format is an image format in which a left-view image and a right-view image respectively corresponding to a left region and a right region of a 3D composite format image are arranged side by side. The top-and-bottom format is an image format in which a left-view image and a right-view image respectively corresponding to an upper region and a lower region of the 3D composite format image are arranged.

The vertical line interleaved format is an image format in which a left-view image and a right-view image respectively corresponding to odd-numbered vertical lines and even-numbered vertical lines of the 3D composite format image are arranged. The horizontal line interleaved format is an image format in which a left-view image and a right-view image respectively corresponding to odd-numbered horizontal lines and even-numbered horizontal lines of the 3D composite format image are arranged.

The frame sequential format is an image format in which a left-view image and a right-view image respectively corresponding to odd-numbered frames and even-numbered frames of the 3D composite format image are arranged. The field sequential format is an image format in which a left-view image and a right-view image respectively corresponding to odd-numbered fields and even-numbered fields of the 3D composite format image are arranged.

The checker board format is an image format in which a left-view image and a right-view image respectively corresponding to pixels in a horizontal direction and pixels in a vertical direction of the 3D composite format image are arranged alternately in units of pixels.

Parameter 'is_left_first' represents format arrangement sequence information that represents a sequence in which a left-view image and a right-view image of the 3D composite format image are arranged. Parameter 'is_left_first' may represent which region is a left-view image of the 3D composite format image of the current video stream and which region is a right-view image thereof. Format arrangement sequence information according to an exemplary embodiment is linked with the 3D composite format information with reference to Table 11, so that positions of a left-view image and a right-view image of the 3D composite format image may be set as follows.

TABLE 11

| | identification | | | |
|---|---|---|---|---|
| | is_left_first = 0 | | is_left_first = 1 | |
| | Left view | Right View | Left view | Right view |
| Side by side format | Left side | Right side | Right side | Left side |
| Top and bottom format | Upper side | Lower side | Lower side | Upper side |
| Vertical line interleaved format | Odd line | Even line | Even line | Odd line |
| Horizontal line interleaved format | Odd line | Even line | Even line | Odd line |
| Frame sequential format | Odd frame | Even frame | Even frame | Odd frame |
| Field sequential format | Odd field | Even field | Even field | Odd field |
| Checker board format | Odd pixel | Even pixel | Even pixel | Odd pixel |

When the value of parameter 'is_left_first' is 0, left video data is arranged in a left region of a side by side format image, an upper region of a top and bottom format image, odd-numbered lines of a vertical line interleaved format image, odd-numbered lines of a horizontal line interleaved format image, odd-numbered frames of a frame sequential format image, odd-numbered fields of a field sequential format image, and odd-numbered pixels of a checker board format image. Thus, right-view video data is arranged in a region opposite to the region of each of the 3D composite format images where the left-view video data is arranged.

When the value of parameter 'is_left_first' is 1, the right-view video data and the left-view video data are arranged in a manner opposite to the arrangement manner when the value of parameter 'is_left_first' is 0.

When the size indicator information of the current video stream represents that left-view and right-view video information is transmitted at a size reduced from the full size of the original left-view and right-view video information, that is, when the value of parameter 'full_image_size_indicator' is 0, parameter 'additional_view_image_size', parameter 'scaling_method', and parameter 'scaling_order' may be set as follows.

Parameter 'additional_view_image_size' includes additional-view image size information that represents a rate at which the image size of additional-view video information of the current video stream is enlarged or reduced from the original image size. Additional-view video information according to an exemplary embodiment may be set as follows with reference to Table 12.

TABLE 12

| additional_view_image_size | Description |
|---|---|
| 0x00 | horizontal half |
| 0x01 | vertical half |
| 0x02 | quarter size |
| 0x03~0x0f | reserved |

When the value of parameter 'additional_view_image_size' is 0x00, it represents a method of halving the image size of the additional-view video information in a horizontal direction. This method is an additional-view image reducing method that can be efficiently used in 3D display devices for halving input video data in a horizontal direction and reproducing a result of the halving, including parallax barrier display devices.

When the value of parameter 'additional_view_image_size' is 0x01, it represents a method of halving the image size of the additional-view video information in a vertical direction. This additional-view image reducing method may be efficiently used in display devices for halving the resolution of an image in a vertical direction and reproducing a result of the halving, including display devices that perform reproduction while changing a polarization angle in units of horizontal lines of a 3D video.

When the value of parameter 'additional_view_image_size' is 0x02, it represents a method of reducing the image size by half in a vertical direction and in a horizontal direction, respectively, and thus reducing the image size to ¼ overall. This additional-view image reducing method may be used in depth information or disparity information rather than video data in order to reduce loss and increase compression efficiency.

Parameter 'scaling_method' represents down-scaling method information that represents a method of down-scaling the left-view image and the right-view image of a 3D composite format image. A 3D composite format scales down the video data of a frame for each of a plurality of views so that a single frame includes data pieces for the plurality of views. The down-scaling may be performed using any of various down-scaling methods. However, since the down-scaling method is performed in a pre-processing process occurring before compression, if the image size is restored according to an up-scaling method not corresponding to the down-scaling method during video decoding, artifacts may be generated on a restored image. An example where artifacts may be generated during image down-scaling and image restoration will now be described with reference to FIG. 13.

Figure 13:
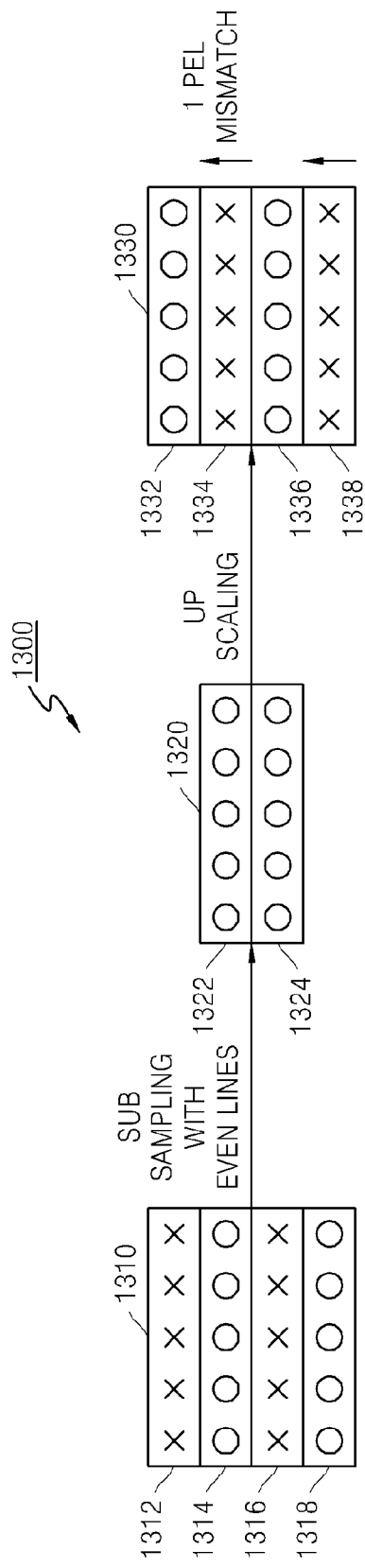
FIG. 13 illustrates an example in which down-scaling method information for 3D composite formats is used, according to an exemplary embodiment.
Figure 14:
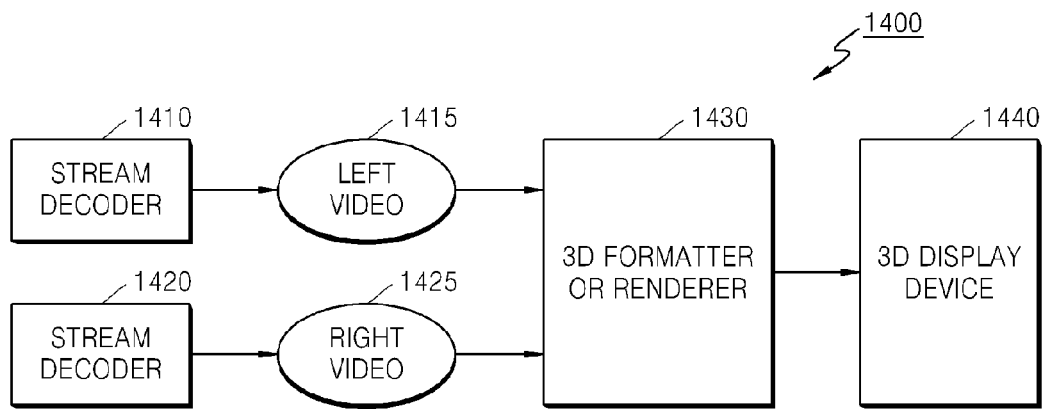
FIGS. 14, 15, 16, 17, and 18 are schematic views of reproduction units of a digital broadcasting stream receiving apparatus according to exemplary embodiments.
Figure 15:
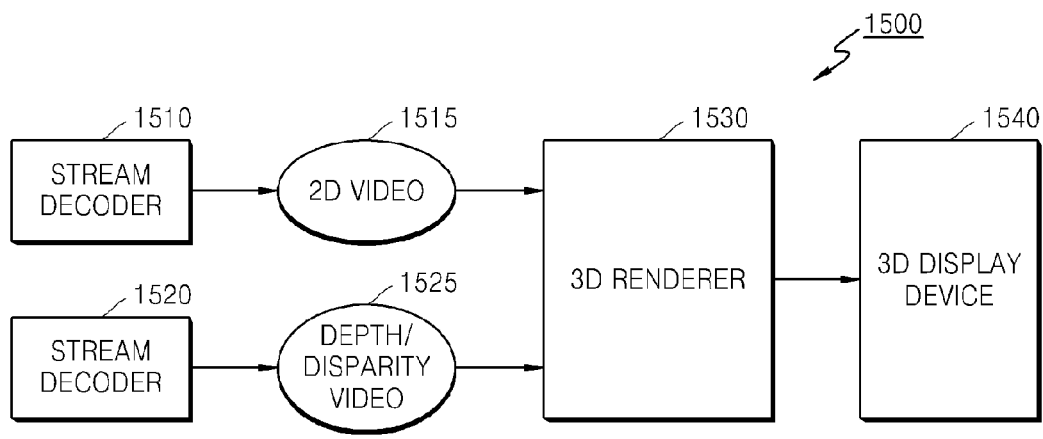
Figure 16:
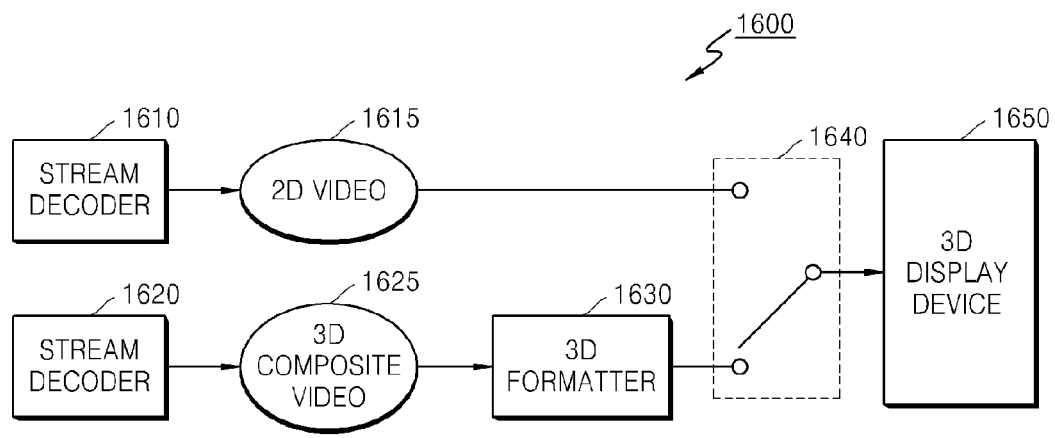
Figure 17:
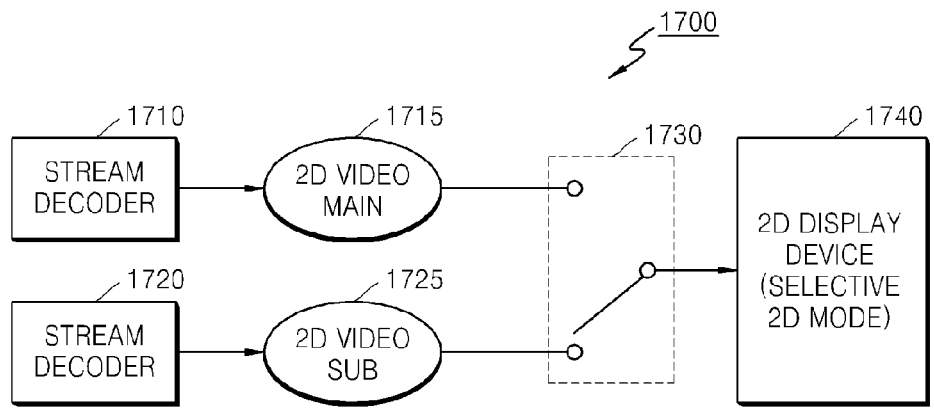
Figure 18:
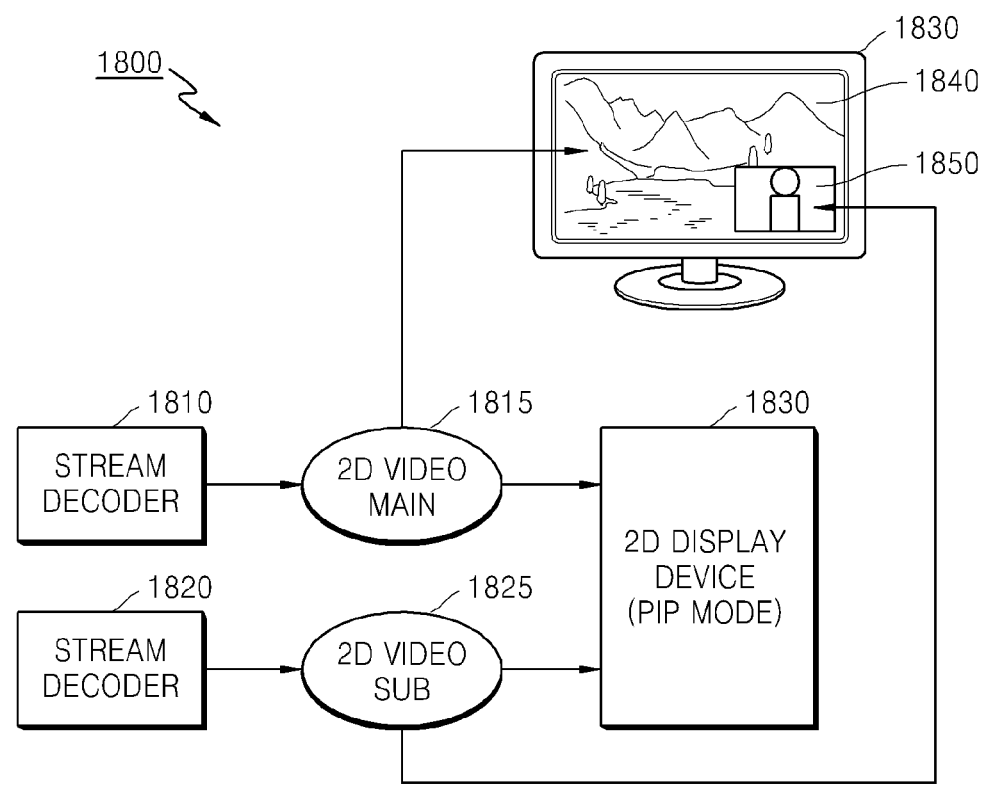

FIG. 13 illustrates an example in which down-scaling method information for 3D composite formats is used, according to an exemplary embodiment.

For example, only even-numbered lines 1314 and 1318 from among lines 1312, 1314, 1316, and 1318 of an original image 1310 are sub-sampled and arranged in an upper region 1320 of a top-and-bottom format image. In other words, lines 1322 and 1324 of the upper region 1320 of the top-and-bottom format image are the same as the even-numbered lines 1314 and 1318 of the original image 1310.

However, if the lines 1322 and 1324 of the top-and-bottom format image are arranged at locations of odd-numbered lines 1332 and 1336 of a restored image 1330, and not at locations of even-numbered lines 1334 and 1338 of the restored image 1330, during an up-scaling operation performed during image decoding, one-pixel mismatch in a vertical direction may occur in all pixels of the restored image 1330. If a left-view image and a right-view image are each mismatched in units of one pixel, mismatch in units of a maximum of two pixels may occur in a 3D video.

Thus, to achieve accurate restoration of a 3D video, the digital broadcasting stream transmitting apparatus 100 of FIG. 1 and the digital broadcasting stream receiving apparatus 200 of FIG. 2 may transmit and receive the down-scaling method information for 3D composite formats. Down-scaling method information according to an exemplary embodiment may be set as parameter 'scaling_method' as in Table 13.

TABLE 13

| scaling_method | Description |
|---|---|
| 0x00 | sampling method |
| 0x01 | averaging method |
| 0x02~0x03 | Reserved |

When the value of parameter 'scaling_method' is 0x00, a current 3D composite format may include left-view image information and right-view image information that have been down-scaled according to a sampling method in which one of every two consecutive lines is selected and extracted.

When the value of parameter 'scaling_method' is 0x01, the current 3D composite format may include left-view image information and right-view image information that have been down-scaled with respect to two consecutive lines of each of an original left-view image and an original right-view image with a single line by replacing the two consecutive lines with a result of an arithmetic operation performed thereon. A representative method of forming a 3D composite format with a down-scaled left-view image and a down-scaled right-view image may be an averaging method in which an average value between pixels of two consecutive lines is determined as a pixel value of a single line.

Parameter 'scaling_order' represents down-scaling sampling order information that represents a sampling order of a 3D composite format image down-scaled according to a sampling method. When the value of parameter 'scaling_method' representing the down-scaling sampling order information is 0x00, it represents which lines from among odd-numbered and even-numbered lines of a left-view image and a right-view image are sampled to constitute a 3D composite format. An example of using down-scaling sampling order information according to an exemplary embodiment is shown in Table 14.

TABLE 14

| scaling_order | left view | right view |
|---|---|---|
| 0x00 | odd line | even line |
| 0x01 | even line | odd line |
| 0x02 | odd line | odd line |
| 0x03 | even line | even line |

When the value of parameter 'scaling_order' is 0x00, an odd-numbered line of a left-view image is sampled and an even-numbered line of a right-view image is sampled to construct a 3D composite format image. Similarly, when the value of parameter 'scaling_order' is 0x01, an even-numbered line of a left-view image is sampled and an odd-numbered line of a right-view image is sampled to construct a 3D composite format image. When the value of parameter 'scaling_order' is 0x02, an odd-numbered line of a left-view image and an odd-numbered line of a right-view image are sampled to construct a 3D composite format image. When the value of parameter 'scaling_order' is 0x03, an even-numbered line of a left-view image and an even numbered line of a right-view image are sampled to construct a 3D composite format image.

Hereinafter, parameter 'Is_Main', parameter 'picture_display_order', and parameter 'view_info' are set when the video property information of the current video stream represents 3D video data, that is, when parameter '3d_video_property' is 'Left Video' or 'Right Video'.

Parameter 'Is_Main' represents base-view indicator information that represents whether the current video stream is a base-view video stream. For example, when parameter '3d_video_property' representing the video property information of the current video stream is 'Left video', parameter 'Is_Main' may be set as in Table 15.

TABLE 15

| Is_Main | Description |
| --- | --- |
| 0x0 | Sub Video |
| 0x1 | Main Video |

That is, when the value of parameter 'Is_Main' is 0, left-view video data is set to be a sub video. When the value of parameter 'Is_Main' is 1, the left-view video data is set to be a main video.

Parameter 'picture_display_order' represents display order information that represents an order in which ESs of left-view and right-view are displayed.

Parameter 'view_info' represents 3D-video view-related information in which, if a current video stream is a 3D video, view information is set differently for children and adults. In consideration of the fact that children and adults are different in binocular variances, view-related information such as depth and disparity may be set differently for children and adults. For example, an image for adults is an image having a relatively large binocular parallax, and an image for children is an image having a relatively small binocular parallax. Due to the use of parameter 'view_info', images for adults may be distinguished from images for children, and also selective 3D reproduction may be performed according to the screen size of a 3D display device. Parameter 'view_info' may be used so that if the screen size of a 3D display device is relatively large, a 3D image having a relatively small binocular parallax is reproduced and if the screen size of a 3D display device is relatively small, a 3D image having a relatively large binocular parallax is reproduced. When 3D video contents are manufactured in consideration of this case, a stereoscopic effect may be uniformly provided to viewers regardless of the size of a 3D display.

Parameter 'view_index' represents video index information that indicates a current view from among multiple views of a current video stream if the current video stream is in regards to one of a plurality of 2D videos each including the multiple views. In other words, if parameter '3d_video_property' representing the video property information of the current video stream is '2D_Multi', parameter 'view_index' may be set. Parameter '2D_Multi' may be used when a service including a plurality of 2D videos is received. In this case, parameter 'view_index' may be used to distinguish 2D moving pictures from one another.

Parameter 'es_icon_indicator' represents a 3D video service notification indicator that indicates provision of 3D service-related icons from a contents provider. Indication of notification of a 3D video service may be inserted into contents through the 3D video service notification indicator without overlapping with a settop box or a TV.

The digital broadcasting stream transmitting apparatus 100 of FIG. 1 and the digital broadcasting stream receiving apparatus 200 of FIG. 2 may transmit and receive information associated with conversion of a 2D or 3D reproduction mode in the current video stream. Hereinafter, a reproduction mode transition indicator, reproduction mode conversion time information, or the like may be set as the information associated with reproduction mode conversion.

Parameter 'transition_indicator' includes a reproduction mode transition indicator that indicates whether a 2D/3D video reproduction mode different from that set in current PMT information is set in PMT information following the current PMT information. The reproduction mode transition indicator indicates that, when different pieces of reproduction mode information are set in the following PMT information and the current PMT information, a reproduction mode transition has occurred.

Parameter 'transition_time_stamp' represents reproduction mode transition time information that represents, in units of Presentation Time Stamps (PTSs), the time during which reproduction mode transition occurs. The reproduction mode transition time information may be set as an absolute period of time or as a relative period time starting from a predetermined reference point of time.

Parameter 'transition_message' includes a variety of message information such as a text, an image, an audio, and the like for notifying viewers of a reproduction mode transition. For example, parameter 'transition_message' includes size information and message information of a reproduction mode transition message, and a reproduction mode transition message may be represented in an 8-bit character string by using a for statement that is repeated by a number of times corresponding to the value of a message size parameter.

The 3D video stream descriptor according to an exemplary embodiment is not limited to the syntax shown in Table 7 and may be suitably changed when a 3D video is expanded into a multi-view image or used for predetermined purposes.

The TS generation unit 120 of the digital broadcasting stream transmitting apparatus 100 of FIG. 1 may insert a multi-view video stream descriptor for accurate distinction among multi-view video streams into the PMT information for the current video stream. The ES extraction unit 220 of the digital broadcasting stream receiving apparatus 200 of FIG. 2 may extract the multi-view video stream descriptor from the PMT information for the current video stream. The multi-view video stream descriptor includes additional information used by the reproduction unit 230 of the digital broadcasting stream receiving apparatus 200 of FIG. 2 to accurately restore and reproduce multi-view video streams.

A multi-view video stream descriptor according to an exemplary embodiment may be set as in Table 16.

TABLE 16

| Syntax |
| --- |
| multiview_video_stream_descriptor( ){<br>    descriptor_tag<br>    descriptor_length<br>    number_of_views<br>    mv_numbering<br>} |

Parameter 'number_of_views' represents information about the number of views of a multi-view video stream.

Parameter 'mv_numbering' represents video index information of the multi-view video stream. For example, the value of parameter 'mv_numbering' may be set to start at 0 for a leftmost view video stream and increase by 1 with each video stream to the right of the leftmost view video stream. The value of parameter 'mv_numbering' of the leftmost view video stream may be set to be 0, and the value of parameter 'mv_numbering' of the leftmost view video stream may be set to be a value obtained by subtracting 1 from the value of parameter 'number_of_views'.

A location of a base-view video stream in a multi-view video stream may be predicted from parameter 'linking_priority' of parameter 'linking_descriptor'. The value of parameter 'linking_priority' of the base-view video stream may be set to be 10, and the values of parameter 'linking_priority' of the other-view video streams may be all set to be 11.

By referring to the aforementioned link descriptor and the 3D video stream descriptor, the digital broadcasting stream transmitting apparatus 100 of FIG. 1 may set a partial link descriptor and a 3D video stream descriptor of a left-view video stream corresponding to the base-view video stream as in Table 17 and set a partial link descriptor and a 3D video stream descriptor of a right-view video stream corresponding to an additional-view video stream as in Table 18.

TABLE 17

| Syntax | Value |
| --- | --- |
| linking_priority | 10 |
| 3d_video_property | 0000 |
| linked_stream_coding_mode | 000 |
| full_image_size_indicator | 1 |

TABLE 18

| Syntax | value |
| --- | --- |
| linking_priority | 11 |
| 3d_video_property | 0001 |
| linked_stream_coding_mode | 000 |
| full_image_size_indicator | 1 |

If the digital broadcasting stream receiving apparatus 200 of FIG. 2 extracts a link descriptor and a 3D video stream descriptor for a first video stream set as in Table 17, since link priority information for the first video stream is 'linking_priority==10' and 3D video property information for the first video stream is '3d_video_property==0000', it may be determined that the first video stream is a left-view video stream of a reference view having higher priority than the opponent video stream associated with the first video stream.

If the digital broadcasting stream receiving apparatus 200 of FIG. 2 extracts a link descriptor and a 3D video stream descriptor for a second video stream set as in Table 18, since link priority information for the second video stream is 'linking_priority==11' and 3D video property information for the second video stream is '3d_video_property==0001', it may be determined that the second video stream is a right-view video stream of an additional view having lower priority than the opponent video stream associated with second first video stream.

The digital broadcasting stream receiving apparatus 200 of FIG. 2 may determine that, as the values of parameter 'linked_stream_coding_mode' for the first and second video streams are 000, the first and second video streams have been encoded according to an encoding method independent from that used to encode the opponent video stream, and that as the value of parameter 'full_image_size_indicator' is 1, the original image size is maintained.

FIGS. 14, 15, 16, 17, and 18 are schematic views of reproduction units of digital broadcasting stream receiving apparatuses according to exemplary embodiments. A method in which the reproduction unit 230 of the digital broadcasting stream receiving apparatus 200 of FIG. 2 restores and reproduces 3D or 2D video data from a video stream will now be described with reference to FIGS. 14 through 18.

According to a first exemplary embodiment 1400 of the reproduction unit 230, left-view video data 1415 and right-view video data 1425 may be restored by stream decoders 1410 and 1420, respectively. The left-view video data 1415 and the right-view video data 1425 may be converted into a 3D reproduction format that can be reproduced as a 3D video, by a 3D formatter or renderer 1430. A signal of the 3D reproduction format may be reproduced by a 3D display device 1440.

According to a second exemplary embodiment 1500 of the reproduction unit 230, 2D video data 1515 and depth/disparity video 1525 may be restored by stream decoders 1510 and 1520, respectively. The 2D video data 1515 and the depth/disparity video 1525 may be converted into the 3D reproduction format by a 3D renderer 1530. A signal of the 3D reproduction format may be reproduced by a 3D display device 1540.

According to a third exemplary embodiment 1600 of the reproduction unit 230, 2D video data 1615 and a 3D composite video 1625 may be restored by stream decoders 1610 and 1620, respectively. The 3D composite video 1625 is converted into the 3D reproduction format by a 3D formatter 1630. The 2D video data 1615 and a signal of the 3D reproduction format may undergo a reproduction mode conversion process 1640 based on a user input or an automatic reproduction mode conversion algorithm and then may be selectively reproduced by a 3D display device 1650.

According to a fourth exemplary embodiment 1700 of the reproduction unit 230, main 2D video data 1715 and sub 2D video data 1725 may be restored by stream decoders 1710 and 1720, respectively. The main 2D video data 1715 and the sub 2D video data 1725 may undergo a video conversion process 1730 based on a user input or a main/sub video selection algorithm and then may be selectively reproduced by a 2D display device 1740.

According to a fifth exemplary embodiment 1800 of the reproduction unit 230, main 2D video data 1815 and sub 2D video data 1825 may be restored by stream decoders 1810 and 1820. The main 2D video data 1815 and the sub 2D video data 1825 may be reproduced in a PIP mode by a 2D display device 1830. In other words, the main 2D video data 1815 may be reproduced on a screen 1840 of the 2D display device 1830 to cover the screen 1840 entirely, and the sub 2D video data 1825 may be reproduced on a partial screen 1850 of the 2D display device 1830.

A Main 2D video and a sub 2D video are not videos for achieving a stereoscopic effect of 3D contents but may be videos of mutually associated contents. For example, a 2D video of a main view may contain contents of a baseball game scene, and a 2D video of a sub view may contain contents of additional information of a baseball game, such as stand scenes, analysis information of the pitching posture of a current pitcher, batting average information of the current pitcher, and the like.

In this case, the digital broadcasting stream transmitting apparatus 100 of FIG. 1 may set and transmit link information and 3D video stream information for the main 2D video and the sub 2D video, and the digital broadcasting stream receiving apparatus 200 of FIG. 2 may restore the main 2D video and the sub 2D video linked with each other by using the link information and the 3D video stream information and selectively reproduce the main 2D video and the sub 2D video or reproduce the same in the PIP mode. Accordingly, a user may watch a variety of information about a baseball game in a sub view while continuously watching the baseball game in a main view.

The digital broadcasting stream transmitting apparatus 100 of FIG. 1 transmit and the digital broadcasting stream receiving apparatus 200 of FIG. 2 receive link information between mutually associated video streams for a data stream that provides 3D video and 2D video, thereby realizing a 3D digital video contents broadcasting system while securing compatibility with digital broadcasting systems for 2D contents services.

The digital broadcasting stream transmitting apparatus 100 of FIG. 1 and the digital broadcasting stream receiving apparatus 200 of FIG. 2 provide 3D moving picture services which are not interrupted by time and place, by providing 2D digital contents and 3D digital contents while securing compatibility with media such as digital video discs (DVDs).

Figure 19:
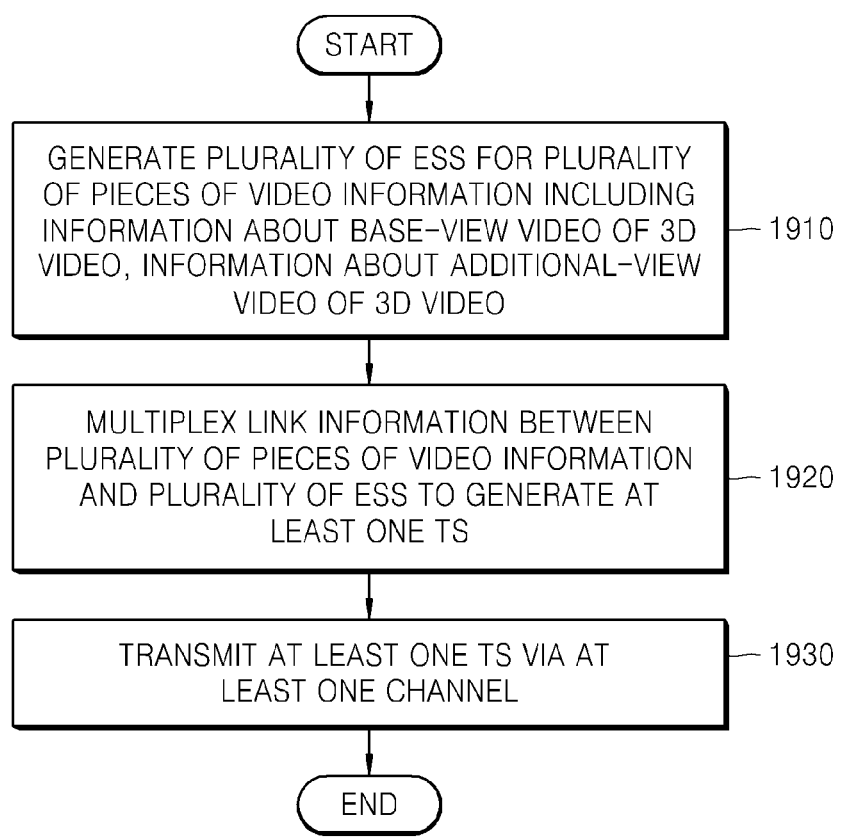
FIG. 19 is a flowchart of a digital broadcasting stream transmitting method capable of providing 3D video services, according to an exemplary embodiment.

FIG. 19 is a flowchart of a digital broadcasting stream transmitting method capable of providing 3D video services, according to an exemplary embodiment.

In operation 1910, a plurality of ESs for a plurality of pieces of video information including at least one of information about a base-view video of a 3D video, information about an additional-view video of the 3D video, and a 2D video having a different view from that of the 3D video are generated.

In operation 1920, link information between the plurality of pieces of video information and the plurality of ESs are multiplexed to generate at least one TS.

In operation 1930, the at least one TS is transmitted via at least one channel.

Figure 20:
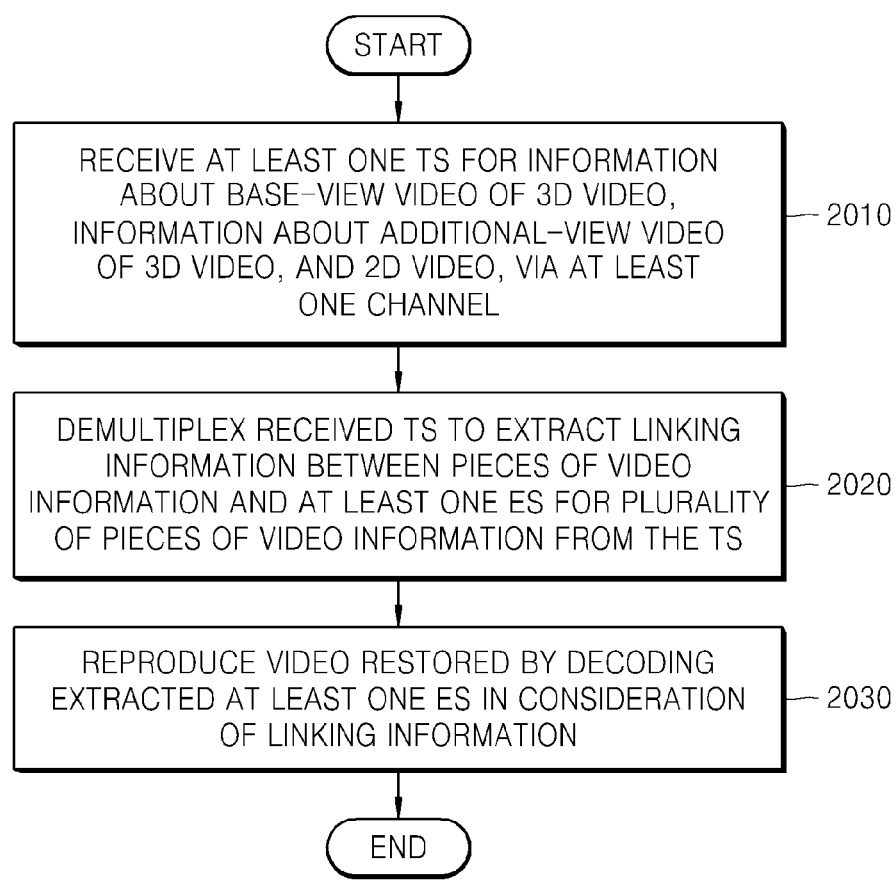
FIG. 20 is a flowchart of a digital broadcasting stream receiving method capable of providing 3D video services, according to an exemplary embodiment.

FIG. 20 is a flowchart of a digital broadcasting stream receiving method capable of providing 3D video services, according to an exemplary embodiment.

In operation 2010, at least one TS is received via at least one channel. The at least one TS may include a plurality of pieces of video information including at least one of information about a base-view video of a 3D video, information about an additional-view video of the 3D video, and a 2D video having a different view from that of the 3D video.

In operation 2020, the at least one received TS is demultiplexed to extract linking information between pieces of video information and at least one ES for the plurality of video information pieces from the TS.

In operation 2030, at least one of 3D video data and 2D video data restored by decoding the extracted at least one ES is reproduced in consideration of a link represented by the linking information.

The digital broadcasting stream transmitting method of FIG. 19 and the digital broadcasting stream receiving method of FIG. 20 may be performed by computer program interactions, respectively. By doing this, operations of the digital broadcasting stream transmitting apparatus 100 and the digital broadcasting stream receiving apparatus 200 that are performed according to the exemplary embodiments described above with reference to FIGS. 1, 2, 5-12, and 14-18 may be implemented.

Exemplary embodiments can be written as computer programs and can be implemented in general-use digital computers that execute the programs using a computer readable recording medium. Examples of the computer readable recording medium include magnetic storage media (e.g., ROM, floppy disks, hard disks, etc.) and optical recording media (e.g., CD-ROMs, or DVDs). Moreover, one or more units of the apparatuses 100, 200, 300, 400, 600, 800, 900, and 1000 can include a processor or microprocessor executing a computer program stored in a computer-readable medium.

While exemplary embodiments have been particularly shown and described above, it will be understood by those of ordinary skill in the art that various changes in form and details may be made therein without departing from the spirit and scope of the present inventive concept as defined by the following claims.

What is claimed is:

1. A digital broadcasting stream transmitting method for providing three-dimensional (3D) video services, the method comprising:

generating a plurality of elementary streams for a plurality of pieces of video information comprising at least one of information about a base-view video of a 3D video, information about an additional-view video corresponding to the base-view video, and a two dimensional (2D) video having a view different from views of the 3D video;

generating at least one transport stream by multiplexing the generated plurality of elementary streams with linking information, wherein the linking information is set for a video in an elementary stream of the plurality of elementary streams and the linking information identifies a location of at least one other video which is associated with the video; and transmitting the generated at least one transport stream via at least one channel, wherein the 2D video is reproduced in a 2D reproduction mode.

2. The digital broadcasting stream transmitting method of claim 1, wherein:

the generating the at least one transport stream comprises:
multiplexing each of the generated plurality of elementary streams individually to generate a plurality of single-program transport streams; and
multiplexing each of the generated plurality of single-program transport streams individually to generate a plurality of multi-program transport streams; and the transmitting the generated at least one transport stream comprises transmitting the generated plurality of multi-program transport streams via different channels.

3. The digital broadcasting stream transmitting method of claim 1, wherein the generating the at least one transport stream comprises:
multiplexing each of the generated plurality of elementary streams individually to generate a plurality of single-program transport streams; and multiplexing the generated plurality of single-program transport streams to generate a single multi-program transport stream; and the transmitting the generated at least one transport stream comprises transmitting the generated single multi-program transport stream via a single channel.

4. The digital broadcasting stream transmitting method of claim 1, wherein the generating the at least one transport stream comprises:
multiplexing the generated plurality of elementary streams to generate a single single-program transport stream; and
multiplexing the generated single single-program transport stream to generate a single multi-program transport stream; and the transmitting the generated at least one transport stream comprises transmitting the generated single multi-program transport stream via a single channel.

5. The digital broadcasting stream transmitting method of claim 1, wherein:

the generating the at least one transport stream comprises:
multiplexing each base-view ES for at least one base-view video, from among the generated plurality of ESs, to generate at least one base-view single-program transport stream for the at least one base-view video, and multiplexing each of the generated at least one base-view single-program transport stream to generate at least one base-view multi-program transport stream for the at least one base-view video; and
multiplexing an additional-view elementary stream for information about at least one additional-view video corresponding to the at least one base-view video, from among the generated plurality of elementary streams, to generate a single additional-view single-program transport stream for the at least one additional-view video, and multiplexing the generated single additional-view single-program transport stream to generate a single additional-view mult-program transport stream for the at least one additional-view video; and the transmitting the generated at least one transport stream comprises transmitting the generated at least one base-view multi-program transport stream and the generated single additional-view multi-program transport stream via different channels.

6. The digital broadcasting stream transmitting method of claim 2, wherein the at least one multi-program transport stream is transmitted via channels based on individual types of transmission network systems.

7. The digital broadcasting stream transmitting method of claim 1, wherein the linking information comprises a link identifier that represents whether mutually linked pieces of video information exist in the plurality of pieces of video information included in the generated at least one transport stream.

8. The digital broadcasting stream transmitting method of claim 7, wherein:

the generating the at least one transport stream comprises inserting the link identifier into a program association table for the at least one TS; and the link identifier represents information that indicates whether program map tables for the mutually linked pieces of video information identified by the program association table are linked with each other.

9. The digital broadcasting stream transmitting method of claim 1, wherein the linking information comprises a link descriptor that includes information about a link between mutually linked pieces of video information from among the plurality of pieces of video information included in the at least one transport stream.

10. The digital broadcasting stream transmitting method of claim 9, wherein the generating the at least one transport stream comprises inserting the link descriptor into a program map table for the generated plurality of elementary streams for the mutually linked pieces of video information.

11. The digital broadcasting stream transmitting method of claim 10, wherein the link descriptor comprises at least one of linking priority information that indicates existence or absence of a link between pieces of video information and priority between associated pieces of video information, same-kind transmission network method information that indicates whether the associated video information pieces are transmitted using a single transmission network method, same channel information that indicates whether the associated pieces of video information are transmitted via a single channel, same single-program transport stream information that represents whether the associated pieces of video information exist within a single single-program transport stream, same view information that represents whether the associated pieces of video information have a same view, and linked video stream packet identifier information that indicates a packet identifier of a video stream which includes a corresponding one among the associated pieces of video information.

12. The digital broadcasting stream transmitting method of claim 1, wherein the generating the at least one transport stream comprises inserting a 3D video stream descriptor comprising additional information used to reproduce current video information of a current transport stream, into a program map table for the current video information.

13. The digital broadcasting stream transmitting method of claim 12, wherein the 3D video stream descriptor comprises at least one of 3D video property information that represents video properties of the current video information when the 3D video is constructed, linked video encoding method information that represents a compressive encoding method for the associated pieces of video information, and size indicator information that indicates whether the current video information is transmitted at an original size.

14. The digital broadcasting stream transmitting method of claim 13, wherein the 3D video stream descriptor further comprises at least one of 3D composite format information that represents a 3D composite format obtained and transmitted by composing images corresponding to the base-view video and the additional-view video, format arrangement sequence information that represents a sequence in which a base-view image and an additional-view image of the 3D composite format are arranged, additional-view image size information that represents a rate at which the additional-view video image is enlarged or reduced from an original image size, down-scaling method information that represents a method of down-scaling the base-view image and the additional-view image of the 3D composite format, and down-scaling sampling order information that represents a sampling order to obtain a down-scaled image of the 3D composite format obtained according to a sampling method.

15. The digital broadcasting stream transmitting method of claim 12, wherein the 3D video stream descriptor comprises 3D-video view-related information in which view information is set differently for children and adults.

16. The digital broadcasting stream transmitting method of claim 12, wherein the 3D video stream descriptor comprises at least one of a reproduction mode transition indicator that indicates whether a reproduction mode transition occurs by including a video stream in a reproduction mode different from a reproduction mode of a video stream of a current program map table from among a 2D video reproduction mode and a 3D video reproduction mode, in a program map table following the current program map table, reproduction mode transition time information that represents a time during which the reproduction mode transition occurs, and message information related with the reproduction mode transition.

17. The digital broadcasting stream transmitting method of claim 1, wherein:
the generating the at least one transport stream comprises inserting a multi-view video stream descriptor representing a relationship between pieces of multi-view video information from among the plurality of pieces of video information into a program map table for the pieces of multi-view video information; and
the multi-view video stream descriptor comprises information about a number of views of a multi-view image and index information of the multi-view image.

18. A digital broadcasting stream receiving method for providing three-dimensional (3D) video services, the method comprising:
receiving at least one transport stream for a plurality of pieces of video information comprising at least one of information about a base-view video of a 3D video, information about an additional-view video of the 3D video, and a two-dimensional (2D) video having a different view from views of the 3D video, via at least one channel;
demultiplexing the received at least one transport stream to extract, from the at least one transport stream, linking information and at least one elementary stream for the plurality of pieces of video information, wherein the linking information is set for a video in the at least one elementary stream and the linking information identifies a location of at least one other video which is associated with the video; and
decoding the extracted at least one elementary stream to reproduce at least one of the 3D video and the 2D video restored by the decoding based on the extracted linking information,
wherein the 2D video is reproduced in a 2D reproduction mode.

19. The digital broadcasting stream receiving method of claim 18, wherein:
the receiving comprises receiving at least one multi-program transport stream by decoding each of the at least one channel and receiving a single multi-program transport stream from each of the at least one channel; and
the extracting comprises:
extracting at least one single-program transport stream by demultiplexing each of the received at least one multi-program transport stream and extracting a single single-program transport stream from each of the demultiplexed at least one multi-program transport stream; and
extracting the at least one elementary stream by demultiplexing each of the extracted at least one single-program transport stream and extracting a single elementary stream from each of the demultiplexed at last one single-program transport stream.

20. The digital broadcasting stream receiving method of claim 18, wherein:
the receiving comprises receiving a multi-program transport stream via a channel from among the at least one channel by decoding the channel; and
the extracting comprises:
extracting at least one single-program transport stream by demultiplexing the received multi-program transport stream; and
extracting the at least one elementary stream by demultiplexing each of the extracted at least one single-program transport stream and extracting a single elementary stream from each of the demultiplexed at least one single-program transport stream.

21. The digital broadcasting stream receiving method of claim 18, wherein:
the receiving comprises receiving a multi-program transport stream via a channel from among the at least one channel by decoding the channel; and
the extracting comprises:
extracting a single-program transport stream by demultiplexing the received multi-program transport stream; and
extracting the at least one elementary stream by demultiplexing the extracted single-program transport stream.

22. The digital broadcasting stream receiving method of claim 18, wherein:
the receiving comprises receiving at least one base-view multi-program transport stream for a base-view video and a single additional-view multi-program transport stream for an additional-view video by decoding each of the at least one channel and receiving a single multi-program transport stream, from among the at least one base-view multi-program transport stream and the single additional-view multi-program transport stream, via each of the at least one channel; and
the extracting comprises:
extracting at least one base-view single-program transport stream from the received at least one base-view multi-program transport stream by demultiplexing each of the received at least one base-view multi-program transport stream into a single single-program transport stream, and extracting at least one base-view elementary stream from the extracted at least one base-view single-program transport stream by demultiplexing each of the extracted at least one base-view single-program transport stream into one base-view elementary stream; and
extracting at least one additional-view single-program transport stream from the received single additional-view multi-program transport stream, and extracting at least one additional-view elementary stream from the extracted at least one additional-view single-program transport stream by demultiplexing each of the extracted at least one additional-view single-program transport stream into one additional-view elementary stream.

23. The digital broadcasting stream receiving method of claim 19, wherein the receiving comprises receiving the at least one multi-program transport stream via channels based on individual types of transmission network systems.

24. The digital broadcasting stream receiving method of claim 18, wherein the linking information comprises a link identifier that represents whether mutually linked pieces of video information exist in the plurality of pieces of video information included in the received at least one TS.

25. The digital broadcasting stream receiving method of claim 24, wherein:
the extracting comprises extracting the link identifier from a program association table for the at least one TS; and the link identifier represents information that indicates whether program map tables for the mutually linked pieces of video information identified by the program association table are linked with each other.

26. The digital broadcasting stream receiving method of claim 18, wherein the linking information comprises a link descriptor that includes information about a link between mutually linked pieces of video information from among the plurality of pieces of video information included in the at least one TS.

27. The digital broadcasting stream receiving method of claim 26, wherein the extracting comprises extracting the link descriptor from a program map table for the at least one elementary stream for the mutually linked pieces of video information.

28. The digital broadcasting stream receiving method of claim 26, wherein the link descriptor comprises at least one of linking priority information that indicates existence or absence of a link between pieces of video information and priority between associated pieces of video information, same-kind transmission network method information that indicates whether the associated video information pieces are transmitted using a single transmission network method, same channel information that indicates whether the associated pieces of video information are transmitted via a single channel, same single-program transport stream information that represents whether the associated pieces of video information exist within a single single-program transport stream, same view information that represents whether the associated pieces of video information have a same view, and linked video stream packet identifier information that indicates a packet identifier of a video stream which includes a corresponding one among the associated pieces of video information.

29. The digital broadcasting stream receiving method of claim 18, wherein the extracting comprises extracting a 3D video stream descriptor comprising additional information used to reproduce current video information of a current TS, from a program map table for the current video information.

30. The digital broadcasting stream receiving method of claim 29, wherein the 3D video stream descriptor comprises at least one of 3D video property information that represents video properties of the current video information when the 3D video is constructed, linked video encoding method information that represents a compressive encoding method for the associated pieces of video information, and size indicator information that indicates whether the current video information is transmitted at an original size.

31. The digital broadcasting stream receiving method of claim 29, wherein the 3D video stream descriptor comprises at least of 3D composite format information that represents a 3D composite format obtained and transmitted by composing images corresponding to the base-view video and the additional-view video, format arrangement sequence information that represents a sequence in which a base-view image and an additional-view image of the 3D composite format are arranged, additional-view image size information that represents a rate at which the additional-view video image is enlarged or reduced from an original image size, down-scaling method information that represents a method of down-scaling the base-view image and the additional-view image of the 3D composite format, and down-scaling sampling order information that represents a sampling order to obtain a down-scaled image of the 3D composite format obtained according to a sampling method.

32. The digital broadcasting stream receiving method of claim 29, wherein the 3D video stream descriptor comprises 3D-video view-related information in which view information is set differently for children and adults.

33. The digital broadcasting stream receiving method of claim 29, wherein the 3D video stream descriptor comprises at least one of a reproduction mode transition indicator that indicates whether a reproduction mode transition occurs by including a video stream in a reproduction mode different from a reproduction mode of a video stream of a current program map table from among a 2D video reproduction mode and a 3D video reproduction mode, in a program map table following the current program map table, reproduction mode transition time information that represents a time during which the reproduction mode transition occurs, and message information related with the reproduction mode transition.

34. The digital broadcasting stream receiving method of claim 18, wherein:
the extracting comprises extracting a multi-view video stream descriptor representing a relationship between pieces of multi-view video information from among the plurality of pieces of video information from a program map table for the pieces of multi-view video information; and
the multi-view video stream descriptor comprises information about a number of views of a multi-view image and index information of the multi-view image.

35. The digital broadcasting stream receiving method of claim 18, wherein the decoding comprises:
restoring and extracting base-view video data and additional-view video data of the 3D video from the extracted at least one elementary stream; and
converting the extracted base-view video data and the extracted additional-view video data corresponding to each other based on the linking information into a 3D reproduction format that is reproducible by a 3D display device, and reproducing the 3D reproduction format.

36. The digital broadcasting stream receiving method of claim 18, wherein the decoding comprises:
restoring and extracting base-view 2D video data for the 3D video and at least one of depth information and disparity information for additional-view 2D video data from the extracted at least one elementary stream;
converting the base-view video data and the at least one of the depth information and the disparity information corresponding to base-view video data based on the linking information into base-view video data and additional-view video data that; and
converting the base-view video data and the additional-view video data into a 3D reproduction format that is reproducible by a 3D display device, and reproducing the 3D reproduction format.

37. The digital broadcasting stream receiving method of claim 18, wherein the decoding comprises:
restoring and extracting 3D video data of a 3D composite format and 2D video data from the extracted at least one elementary stream, respectively;
converting the 3D video data of the 3D composite format into base-view video data and additional-view video data that is reproducible by a 3D display device; and
selectively reproducing the base-view video data, the additional-view video data, and the 2D video data corresponding to each other based on the linking information.

38. The digital broadcasting stream receiving method of claim 18, wherein the decoding comprises:
restoring and extracting mutually associated pieces of 2D video data from the extracted at least one elementary stream, respectively; and selectively and independently reproducing pieces of 2D video data corresponding to each other based on the linking information.

39. The digital broadcasting stream receiving method of claim 18, wherein the decoding comprises:
restoring and extracting mutually associated pieces of 2D video data from the extracted at least one elementary stream, respectively; and
selectively reproducing pieces of 2D video data corresponding to each other based on the linking information in a Picture-in-Picture mode.

40. A non-transitory computer-readable recording medium having recorded thereon a program for a digital broadcasting stream transmitting method comprising:
generating a plurality of elementary streams for a plurality of pieces of video information comprising at least one of information about a base-view video of a 3D video, information about an additional-view video corresponding to the base-view video, and a two dimensional (2D) video having a view different from views of the 3D video;
generating at least one transport stream by multiplexing the generated plurality of elementary streams with linking information, wherein the linking information is set for a video in an elementary stream of the plurality of elementary streams and the linking information identifies a location of at least one other video which is associated with the video; and
transmitting the generated at least one transport stream via at least one channel,
wherein the 2D video is reproduced in a 2D reproduction mode.

41. A non-transitory computer-readable recording medium having recorded thereon a program for a digital broadcasting stream receiving method comprising:
receiving at least one transport stream for a plurality of pieces of video information comprising at least one of information about a base-view video of a 3D video, information about an additional-view video of the 3D video, and a two-dimensional (2D) video having a different view from views of the 3D video, via at least one channel;
demultiplexing the received at least one transport stream to extract, from the at least one transport stream, linking information
and at least one elementary stream for the plurality of pieces of video information, wherein the linking information is set for a video in the at least one elementary stream and the linking information identifies a location of at least one other video which is associated with the video; and decoding the extracted at least one elementary stream to reproduce at least one of the 3D video and the 2D video restored by the decoding based on the extracted linking information,
wherein the 2D video is reproduced in a 2D reproduction mode.

42. A digital broadcasting stream transmitting apparatus for providing three-dimensional (3D) video services, the apparatus comprising:
an elementary stream generation unit which generates a plurality of elementary streams for a plurality of pieces of video information comprising at least one of information about a base-view video of a 3D video, information about an additional-view video corresponding to the base-view video, and a two-dimensional (2D) video having a different view from views of the 3D video;
a transport stream generation unit which generates at least one transport stream by multiplexing the generated plurality of elementary streams with linking information, wherein the linking information is set for a video in an elementary stream of the plurality of elementary streams and the linking information identifies a location of at least one other video which is associated with the video; and
a transmission unit which transmits the generated at least one transport stream via at least one channel,
wherein the 2D video is reproduced in a 2D reproduction mode.

43. A digital broadcasting stream receiving apparatus for providing three-dimensional (3D) video services, the apparatus comprising:
a transport stream receiving unit which receives at least one transport stream for a plurality of pieces of video information comprising at least one of information about a base-view video of a 3D video, information about an additional-view video of the 3D video, and a two-dimensional (2D) video having a different view from views of the 3D video, via at least one channel;
an elementary stream extraction unit which demultiplexes the received at least one transport stream to extract, from the at least one transport stream, linking information and at least one elementary stream for the plurality of pieces of video information is inserted, wherein the linking information is set for a video in the at least one elementary stream and the linking information identifies a location of at least one other video which is associated with the video; and
a reproduction unit which reproduces at least one of the 3D video data and 2D video data restored by decoding the extracted at least one elementary stream based on a link represented by the linking information,
wherein the 2D video is reproduced in a 2D reproduction mode.

* * * * *